US012498746B2

(12) United States Patent
Gil et al.

(10) Patent No.: US 12,498,746 B2
(45) Date of Patent: Dec. 16, 2025

(54) DLVR-SUPPLIED LOGIC DOMAIN OPERATIONAL VOLTAGE OPTIMIZATION

(71) Applicant: Intel Corporation, Santa Clara, CA (US)

(72) Inventors: Lior Gil, Haifa (IL); Kosta Luria, Pardesiya M (IL); Michael Zelikson, Haifa HA (IL); Vadim Goldenberg, Kiriat Ata (IL)

(73) Assignee: Intel Corporation, Santa Clara, CA (US)

( * ) Notice: Subject to any disclaimer, the term of this patent is extended or adjusted under 35 U.S.C. 154(b) by 816 days.

(21) Appl. No.: 17/561,054

(22) Filed: Dec. 23, 2021

(65) Prior Publication Data

US 2023/0205242 A1 Jun. 29, 2023

(51) Int. Cl.
*G05F 1/563* (2006.01)
*G05F 1/56* (2006.01)

(52) U.S. Cl.
CPC .............. *G05F 1/563* (2013.01); *G05F 1/561* (2013.01)

(58) Field of Classification Search
CPC . G05F 1/56; G05F 1/561; G05F 1/563; G05F 1/575
USPC ......................................... 323/266, 268, 312
See application file for complete search history.

(56) References Cited

U.S. PATENT DOCUMENTS 8,169,201 B2 * 5/2012 Chung .................... G05F 1/575 323/268
9,939,830 B1 * 4/2018 Lee ......................... G05F 1/565
2010/0164445 A1 * 7/2010 Verma ..................... G05F 1/575 323/281
2021/0286390 A1 * 9/2021 Laur ....................... G05F 1/575
2022/0382308 A1 * 12/2022 Chang ................. H03F 3/45475

* cited by examiner

*Primary Examiner* — Yemane Mehari
(74) *Attorney, Agent, or Firm* — NICHOLSON DE VOS WEBSTER & ELLIOTT LLP

(57) ABSTRACT

A supply voltage may be set using a local voltage regulator, such as a Digital Linear Voltage Regulators (DLVR). A DLVR may include a compensator, and the performance of the compensator may be affected by a dropout (DO) voltage. To improve the performance of a compensator, a number of compensator calculations may be pre-calculated to reduce the complexity of remaining real-time computations and enable compensator calculations to be completed within a single DLVR clock cycle. A DLVR may include a sense filter, and the DLVR transfer function (TF) may be modified using dynamic shaping of open loop gain and pole locations of a sense filter. The DO range associated with the DLVR TF may be changed according to a monitored DO(t) to reduce the sensitivity of a domain VMIN on dropout, which reduces power consumption, increases performance, and enables simplification of test flows.

16 Claims, 14 Drawing Sheets

300

LOGARITHMIC ADC TABLE

| VT-VS | [X]0 | [X]1 | [X]2 | [X]3 | [X]4 | [X]5 | [X]6 | [X]7 | [X]8 | [X]9 | [X]10 | [X]11 | [X]12 | [X]13 | [X]14 | [X]15 | [X]16 | |
|---|---|---|---|---|---|---|---|---|---|---|---|---|---|---|---|---|---|---|
| 147.8 | 0 | 0 | 0 | 0 | 0 | 0 | 0 | 0 | 0 | 0 | 0 | 0 | 0 | 0 | 0 | 0 | 1 | U |
| 96.5 | 0 | 0 | 0 | 0 | 0 | 0 | 0 | 0 | 0 | 0 | 0 | 0 | 0 | 0 | 0 | 1 | 1 | N |
| 62.3 | 0 | 0 | 0 | 0 | 0 | 0 | 0 | 0 | 0 | 0 | 0 | 0 | 0 | 0 | 1 | 1 | 1 | D |
| 39.6 | 0 | 0 | 0 | 0 | 0 | 0 | 0 | 0 | 0 | 0 | 0 | 0 | 0 | 1 | 1 | 1 | 1 | E |
| 24.4 | 0 | 0 | 0 | 0 | 0 | 0 | 0 | 0 | 0 | 0 | 0 | 0 | 1 | 1 | 1 | 1 | 1 | RS |
| 14.3 | 0 | 0 | 0 | 0 | 0 | 0 | 0 | 0 | 0 | 0 | 0 | 1 | 1 | 1 | 1 | 1 | 1 | H O |
| 7.5 | 0 | 0 | 0 | 0 | 0 | 0 | 0 | 0 | 0 | 0 | 1 | 1 | 1 | 1 | 1 | 1 | 1 | O |
| 3.0 | 0 | 0 | 0 | 0 | 0 | 0 | 0 | 0 | 0 | 1 | 1 | 1 | 1 | 1 | 1 | 1 | 1 | T |
| -3.0 | 0 | 0 | 0 | 0 | 0 | 0 | 0 | 0 | 1 | 1 | 1 | 1 | 1 | 1 | 1 | 1 | 1 | O |
| -7.5 | 0 | 0 | 0 | 0 | 0 | 0 | 0 | 1 | 1 | 1 | 1 | 1 | 1 | 1 | 1 | 1 | 1 | V |
| -14.3 | 0 | 0 | 0 | 0 | 0 | 0 | 1 | 1 | 1 | 1 | 1 | 1 | 1 | 1 | 1 | 1 | 1 | E |
| -24.4 | 0 | 0 | 0 | 0 | 0 | 1 | 1 | 1 | 1 | 1 | 1 | 1 | 1 | 1 | 1 | 1 | 1 | RS |
| -39.6 | 0 | 0 | 0 | 0 | 1 | 1 | 1 | 1 | 1 | 1 | 1 | 1 | 1 | 1 | 1 | 1 | 1 | H |
| -62.3 | 0 | 0 | 0 | 1 | 1 | 1 | 1 | 1 | 1 | 1 | 1 | 1 | 1 | 1 | 1 | 1 | 1 | O |
| -96.5 | 0 | 0 | 1 | 1 | 1 | 1 | 1 | 1 | 1 | 1 | 1 | 1 | 1 | 1 | 1 | 1 | 1 | O |
| -147.8 | 0 | 1 | 1 | 1 | 1 | 1 | 1 | 1 | 1 | 1 | 1 | 1 | 1 | 1 | 1 | 1 | 1 | T |

310 315 320

| | | | | | | | | | | | | | | | | | |
|---|---|---|---|---|---|---|---|---|---|---|---|---|---|---|---|---|---|
| 330 | 0 | 0 | 0 | 0 | 0 | 1 | 1 | 1 | 1 | 1 | 1 | 1 | 1 | 1 | 1 | 1 | 1 |
| 335 | 0 | 0 | 0 | 0 | 0 | 1 | 0 | 0 | 0 | 0 | 0 | 0 | 0 | 0 | 0 | 0 | 0 |

FIG. 3

DLVR-SUPPLIED LOGIC DOMAIN OPERATIONAL VOLTAGE OPTIMIZATION

TECHNICAL FIELD

Embodiments described herein generally relate to power driver circuits.

BACKGROUND

Modern systems on a chip (SOCs) frequently use fine granularity power management, such as dynamic voltage and frequency scaling (DVFS). A DVFS management system may operate a domain at a predetermined frequency (e.g., determined based on system-level considerations) and to set a supply voltage to a minimal level, $V_{MIN}$, that is sufficient to support the predetermined frequency. The supply voltage may be set using a local voltage regulator, such as a Digital Linear Voltage Regulators (DLVR). DLVR performance metrics may be monitored based on output voltage setting (e.g., direct current (DC) positioning) accuracy and transient response, which may be used to optimize the output voltage level.

The depth of a transient droop due to a load set event manifests itself in an elevation of $V_{MIN}$. The lower a DLVR loop delay, the faster a DLVR may respond to a load set, which may increase the transient response. Loop delay may include compensator (CPS) computational delay, CPS output signals distribution delay, and power stage (PS) delay. A simple CPS design (e.g., first-order design) is often inadequate for domains that feature high and fast current transients, however an implementation of a more complex CPS architecture may require multi-cycles long computation, which leads to longer loop delays and worse transient response.

A DC positioning error may translate directly to a guard band (GB), applied to a measured $V_{MIN}$ value, and the depth of a transient droop due to a load set manifests itself in an elevation of $V_{MIN}$. Both metrics depend on a selected DLVR transfer function (TF). The use conditions for an SOC may include a requirement that a DLVR is able to function within a wide range of input voltages ($V_{IN}$). In an example, for a work point ($V_{WP}$) of 0.55 V, the range may include 0.57 V$\leq V_{IN} \leq$1.6 V. An important feature of a DLVR TF is its dependency on the dropout (DO) voltage, which is the difference between $V_{IN}$ and $V_{WP}$. A consequent dependence of a domain $V_{MIN}$ on $V_{IN}$ level leads to undesirable $V_{MIN}$ GB and may significantly complicate post-Si validation, such as by requiring a two-dimensional $V_{MIN}$ search.

System requirements for high power DLVR efficiency may include reducing or minimizing the DO voltage, such as by keeping the DLVR input voltage $V_{IN}$ as close as possible to the required output voltage $V_{OUT}$. The gain of a DLVR may drop when the difference between $V_{IN}$ and $V_{OUT}$ ($V_{DS}$) is small. Lower gain leads to a degradation in transient response and higher DC positioning error, which may result in an increase in $V_{MIN}$ and require increased power consumption.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 3 is a table showing logarithmic ADC table, according to an embodiment.

DETAILED DESCRIPTION

Figure 1:
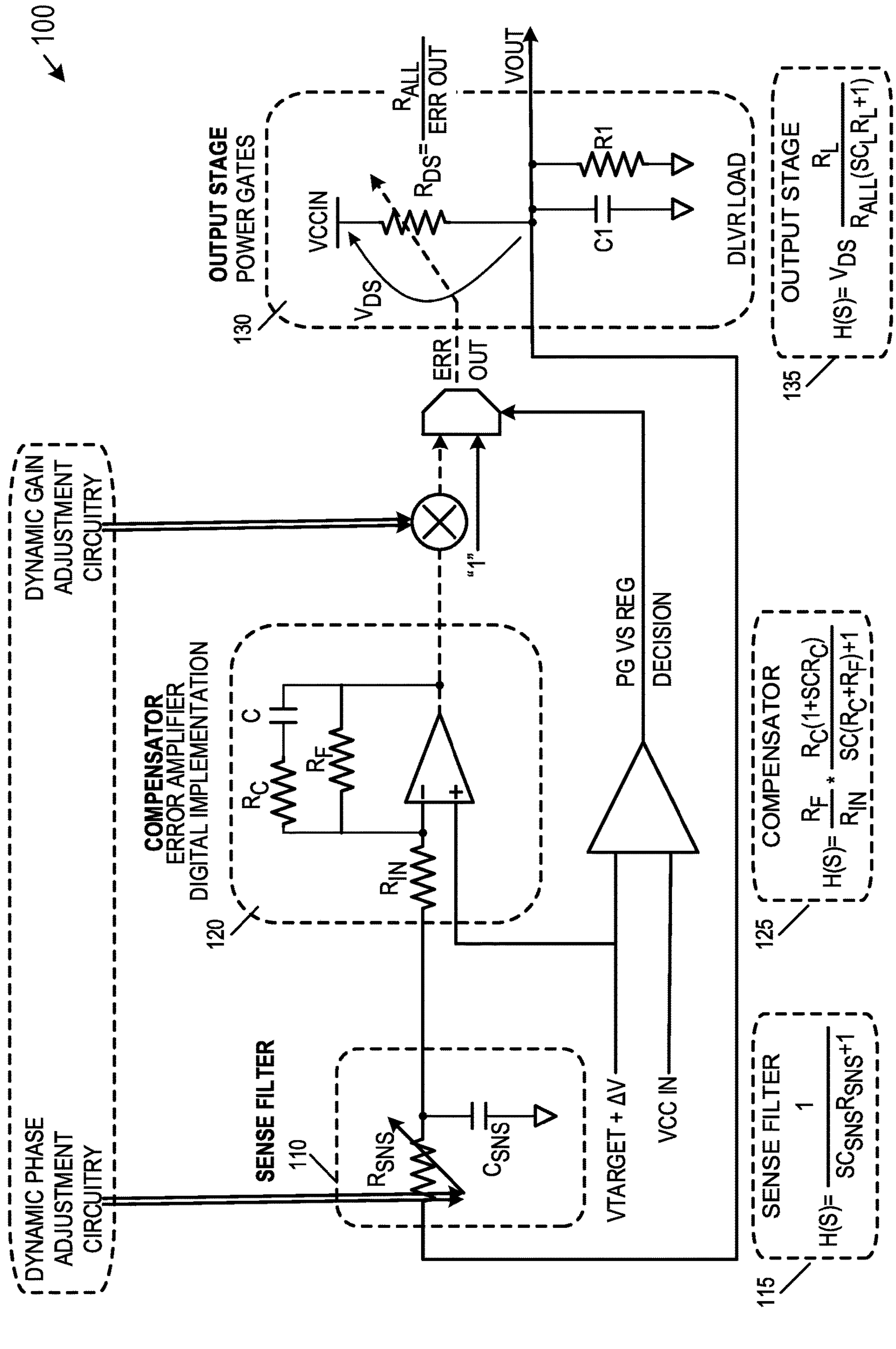
FIG. 1 is a circuit diagram illustrating a DLVR high-level scheme, according to an embodiment.

The circuits and methods described herein provide technical solutions for technical problems facing DLVR circuits. To address problems facing CPS architectures, a significant portion of CPS calculation steps may be pre-calculated. Pre-calculating CPS steps may reduce the complexity of remaining real-time computations, enabling CPS steps to be completed within a single DLVR clock cycle of approximately 500±125 ps. To enable the CPS steps to be completed within a DLVR clock cycle, the DLVR architecture may be selected based on various DLVR architecture considerations described herein. This DLVR architecture enables a linear-only-control-based DLVR design, which provides an adequate transient response while reducing or eliminating complications associated with a Non-Linear Controller (NLC) or with very fast clock usage. For example, this DLVR architecture avoids issues associated with an NLC, such as increased complexity, use of a linear controller, and increased power requirements (e.g., increased $V_{IN}$–$V_{OUT}$ difference). This DLVR architecture also avoids issues associated with operating a DLVR at a high clock frequency of 5-10 GHz, such a increased complexity of CPS design, increased the complexity of clock distribution (e.g., tight duty cycle control), and increased power consumption.

To address problems facing a DLVR TF, the DLVR TF may be modified. The DLVR TF may be modified using dynamic shaping of open loop gain and pole locations of the sense filter. The DO range associated with the DLVR TF may be divided into n sub-ranges (e.g., n buckets). Each bucket may be associated with pre-calculated parameters for a corresponding modification of the DLVR TF. The time-based voltage DO(t) may be monitored and mapped to one of the buckets, and the DLVR TF is changed according to the monitored DO(t). This modification of the DLVR TF may be used to reduce the sensitivity of a domain $V_{MIN}$ on dropout, which reduces power consumption, increases performance, and enables simplification of $V_{MIN}$ test flows (e.g., a reduction in test time). In an example, an CPS tuning may be used to improve transient response and further reduce $V_{MIN}$. This improved DLVR TF avoids the need for a two-dimensional $V_{MIN}$ search, which may increase test time and complexity, and may increase phase margin (PM) complexity. This improved DLVR TF also mitigates sub-optimal DLVR compensator tuning that leads to a deterioration in a domain transient response and $V_{MIN}$ elevation.

To address problems facing $V_{MIN}$ elevation due to DLVR gain lowering, the DLVR DO may be continually monitored. When reaching or falling below a first minimal threshold DO value, the DLVR may transition from a regulated (REG) mode to a bypass (e.g., power gate (PG)) mode. Conversely, when the dropout becomes larger than a second pre-defined threshold, the DLVR may transition from the bypass mode to the regulated mode. Because DLVR power advantages manifest themselves in high DO conditions, this solution does not degrade power-performance benefits of a DLVR-based Power Delivery Network (PDN). This bidirectional transition may be post-Si tunable (e.g., tunable after silicon manufacturing). This transition between bypass mode and REG mode reduces or minimizes $V_{IN}$ and $V_{OUT}$ values, and improves performance by reducing or minimizing power dissipation. By implementing a fully autonomous mode transition, this mode transition solution does not increase testing complexity or testing time, and it is transparent for PM procedures. This mode transition solution avoids the additional power requirements of raising Vin to ensure sufficient DO, and avoids the additional power dissipation of adding a GB.

In the following description, for purposes of explanation, numerous specific details are set forth to provide a thorough understanding of some example embodiments. It will be evident, however, to one skilled in the art that the present disclosure may be practiced without these specific details.

FIG. 1 is a circuit diagram illustrating a DLVR high-level scheme circuit 100, according to an embodiment. The architecture of the controller circuit 100 may include a single-pole/single-zero compensator architecture. FIG. 1 shows a high-level continuous-time equivalent scheme of CPS, including a sense filter 110, a compensator 120, and an output stage 130. The functionality of the compensator 120 in the digital domain is given by Eq. 1:

$$\gamma_i=-\alpha*x_i+\beta*x_{i-1}+\gamma*\gamma_{i-1} \quad \text{(Eq. 1)}$$

In Eq. 1, $x_i$ and $x_{i-1}$ are current and previous values of $V_{sense}$ deviations with respect to the target value ($V_{target}$−$V_{sense}$), $\gamma_i$ and $\gamma_{i-1}$ are current and previous CPS outputs, and $$\begin{pmatrix}\alpha\\ \beta\\ \gamma\end{pmatrix}=\begin{pmatrix}f_1\\ f_2\\ f_3\end{pmatrix}(R_{IN}, R_F, R_C, C).$$

One method of implementing compensator 120 Eq. 1 includes multiplication followed by a summation. However, when $y_i$ and $x_i$ are 16-bit words and when the clock frequency $F_{clk}$=1.6 GHz, such a computation cannot be completed within one or two clock cycles, even if clock frequency $F_{clk}$ increases to 2.27 GHz in a subsequent generation of processors.

Figure 2:
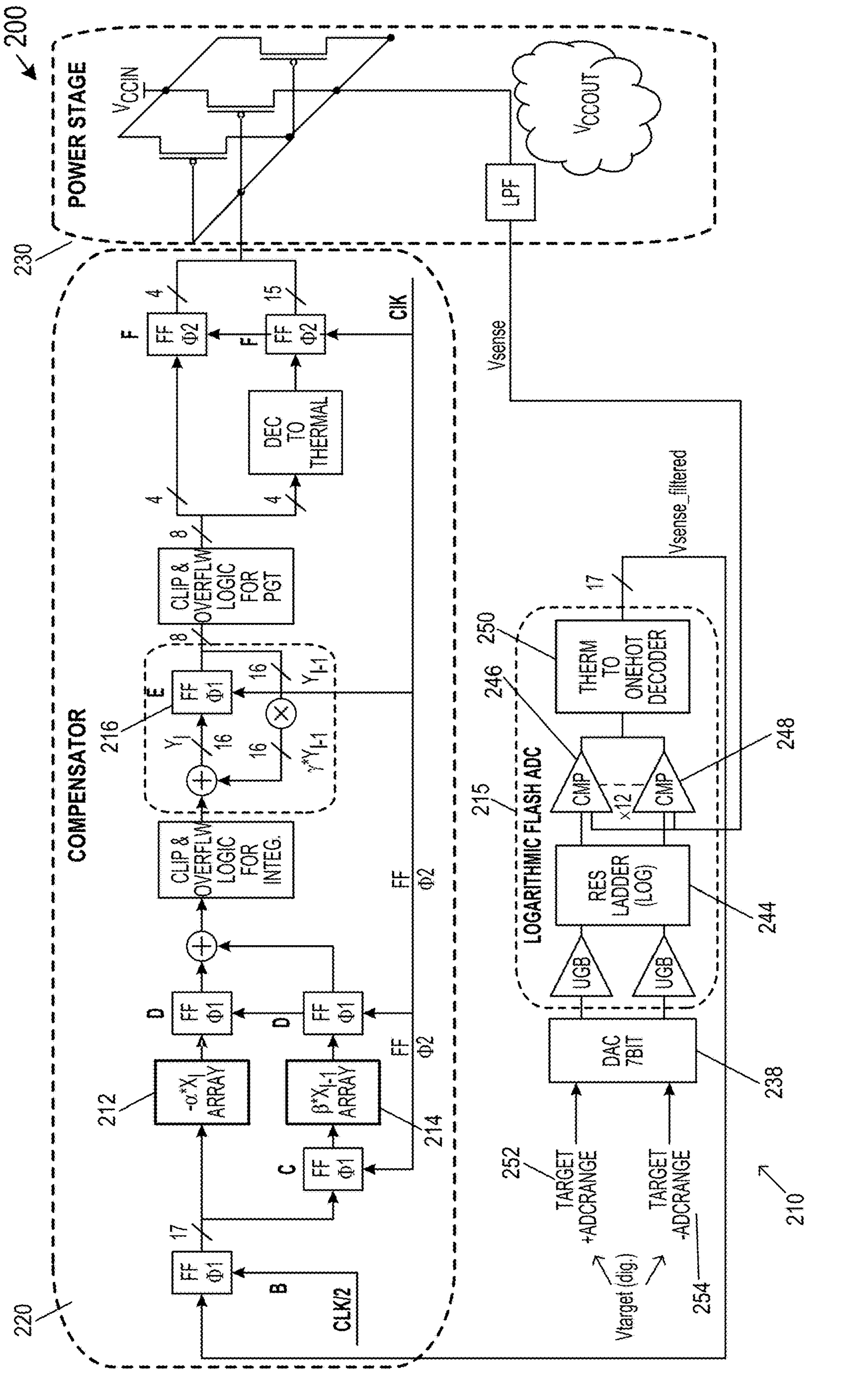
FIG. 2 is a schematic diagram illustrating a CPS circuit, according to an embodiment.

FIG. 2 is a schematic diagram illustrating a CPS circuit 200, according to an embodiment. The CPS circuit 200 may include a compensator 220, a power stage 230, and a voltage sense filter circuit 210 including a logarithmic flash ADC 215. An improved implementation of Eq. 1 includes digitizing the difference Vtarget−Vsense using the logarithmic flash ADC 215. In the depicted figure, the ADC 215 receives the Vtarget through a DAC 238, which receives Vtarget+ADC RANGE (252) and Vtarget−ADC Range (254) values, off of a digitized version of the target voltage (Vtarget) to set upper and lower analog voltage limits for the resistor ladder 244 of the ADC 215. These res. ladder range values are provided to the ADC resistor ladder 244 through unity gain buffers (UGB). From here, the ladder feeds logarithmically spaced reference voltages to the comparators (246, 248-12 in the depicted figure), which compare the received sense voltage (Vsense) to generate a digital (thermometer coded) value that corresponds to the difference between Vtarget and Vsense. This value is then decoded at 250 and provided as a filtered sense voltage (Vsense filtered) to compensator 220, as is shown. In an example, the logarithmic flash ADC 215 may include an 8-bit ADC that is symmetrical around the middle of the sampling window, which may meet a required resolution (e.g., 3 mV) while reducing or minimizing design complexity, required silicon area, and power requirements. An example truth table for such a symmetrical logarithmic 8-bit ADC is shown in FIG. 3.

The output of the logarithmic flash ADC 215 is provided to the compensator 220, which implements Eq. 1. In particular, compensator 220 implements the first term of Eq. 1, $-\alpha*x_i$ at 212, the second term of Eq. 1, $\beta*x_{i-1}$ at 214, and the third term of Eq. 1, $\gamma*\gamma_{i-1}$ at 216. The third term is implemented at 416 as an approximation $$\gamma*y_{i-1}\approx y_{i-1}*\left(1-\frac{1}{2^n}\right),$$

where n is determined by the required accuracy of y, and which includes a right-shift of the previous CPS output value. This implementation of the third term avoids a full multiplication implementation, which may be impractical or impossible to pre-calculate for all possible values of the ADC output (e.g., the previous CPS output), especially when the previous CPS output includes a 16-bit binary word. The summation of the three terms is performed using fast carry-look-ahead adders. By changing complex multiplication into a shift operation, the terms may be pre-computed or computed separately, which allows the terms in Eq. 1 to be determined and summed within one DLVR clock cycle.

FIG. 3 is a table showing logarithmic ADC table 300, according to an embodiment. Table 300 shows an example truth table for a symmetrical logarithmic 8-bit ADC, such as logarithmic flash ADC 230 shown in FIG. 2. Table 300 shows 17 possible ADC output vectors, when its input is a $V_{target}$−$V_{sense}$ difference. ADC comparators threshold form logarithmically spaced levels n={0 . . . 16} that meet a required resolution (e.g., $\Delta_{min}$=3 mV with a 1.5× multiplier). The difference shown in table 300 include undershoot values 310 (e.g., $V_{target}-V_{sense}>0$) and overshoot values 315 (e.g., $V_{target}-V_{sense}<0$). For a given ADC output, a vector $[x_j]$ is converted into one-hot format. In an example, the ADC output for column vector $[x_{11}]$ 320 may be represented as thermometer row vector 330, and may be converted to one-hot format vector 335 in which only the first one-value is nonzero. There are seventeen possible values for the ADC output (e.g., including±out-of-range value). For each 16-bit word α-value, the product of $\alpha*[x_j]$ is pre-calculated and all possible values are stored in a 16×17 α-SRAM memory array. The ADC output, as translated into one-hot format, serves as address of the required $\alpha*[x_j]$ entry of α-SRAM.

Similarly, the β-values are pre-calculated and stored in a corresponding β-SRAM memory array. By pre-computing these values, Eq. 1 may be calculated in one cycle of a fast gigahertz clock, which provides a significant improvement over other solutions that are unable to perform in sub-nanosecond time frames.

FIGS. 4A-4F are graphs showing DLVR characteristics 400, according to an embodiment. The behavior of a given DLVR depends on its transfer function (TF). Returning to the 100 in FIG. 1, each of the sense filter 110, compensator 120, and output stage 130 have associated TFs, including sensor filter TF 115, compensator TF 125, and output stage TF 135. These individual TF form together an effective DLVR TF. These TFs depend on DO conditions, and this TF dependence on DO conditions manifest itself in DLVR characteristics 400 such as phase margin, gain, and output impedance.

Figure 4A:
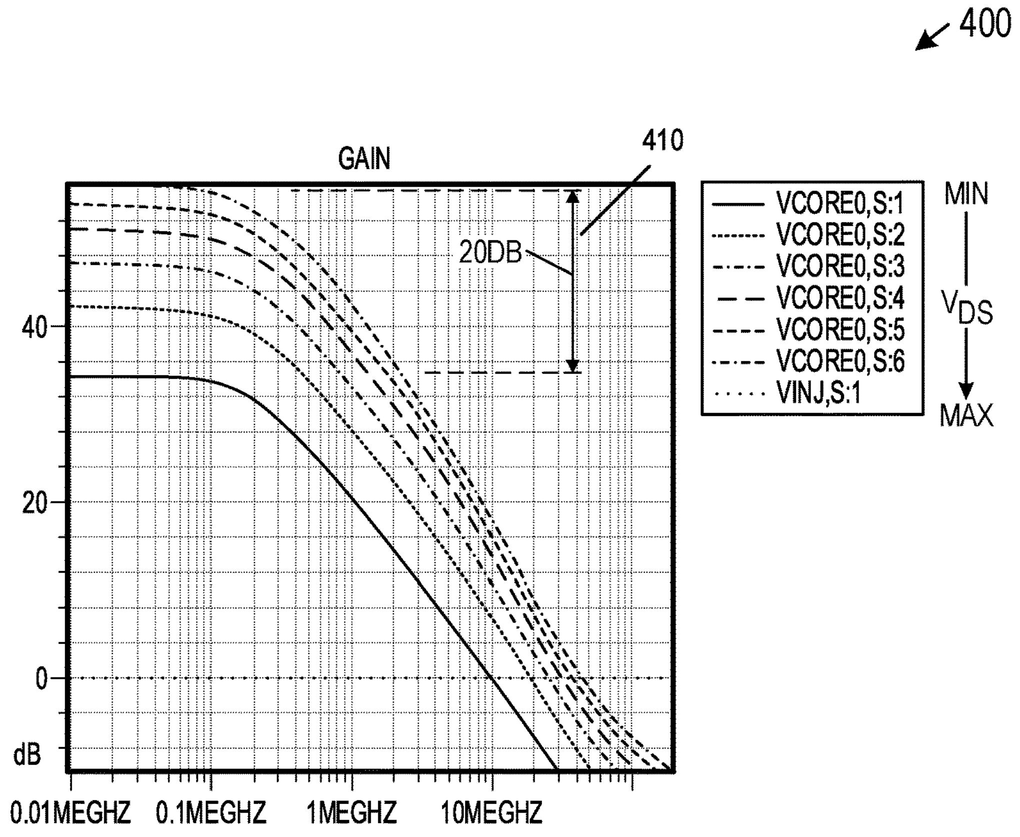
FIGS. 4A-4F are graphs showing DLVR characteristics, according to an embodiment.
Figure 4B:
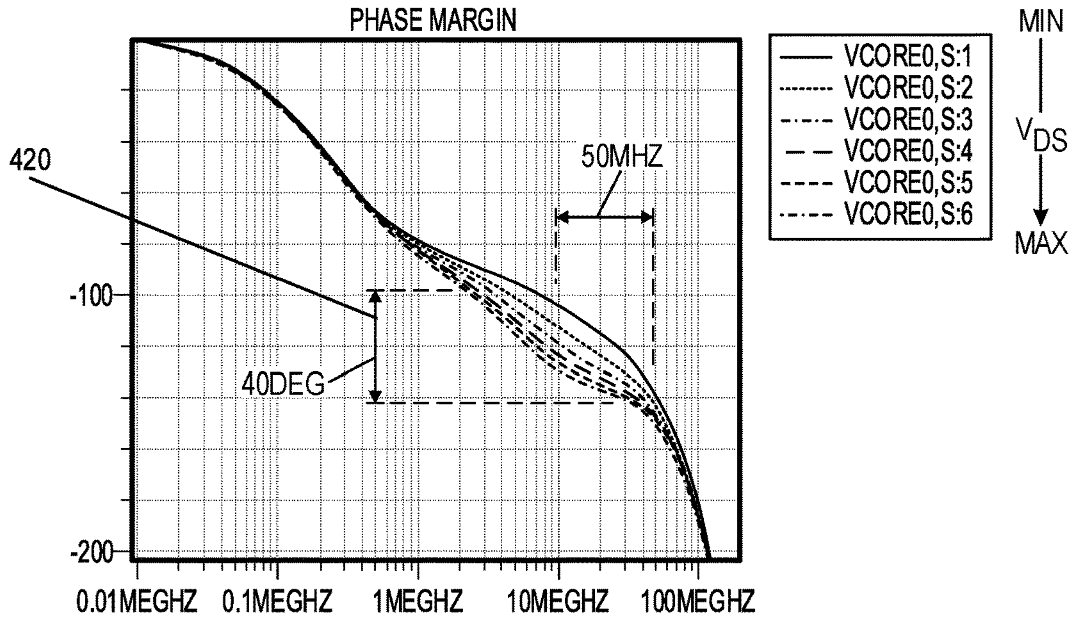
Figure 4C:
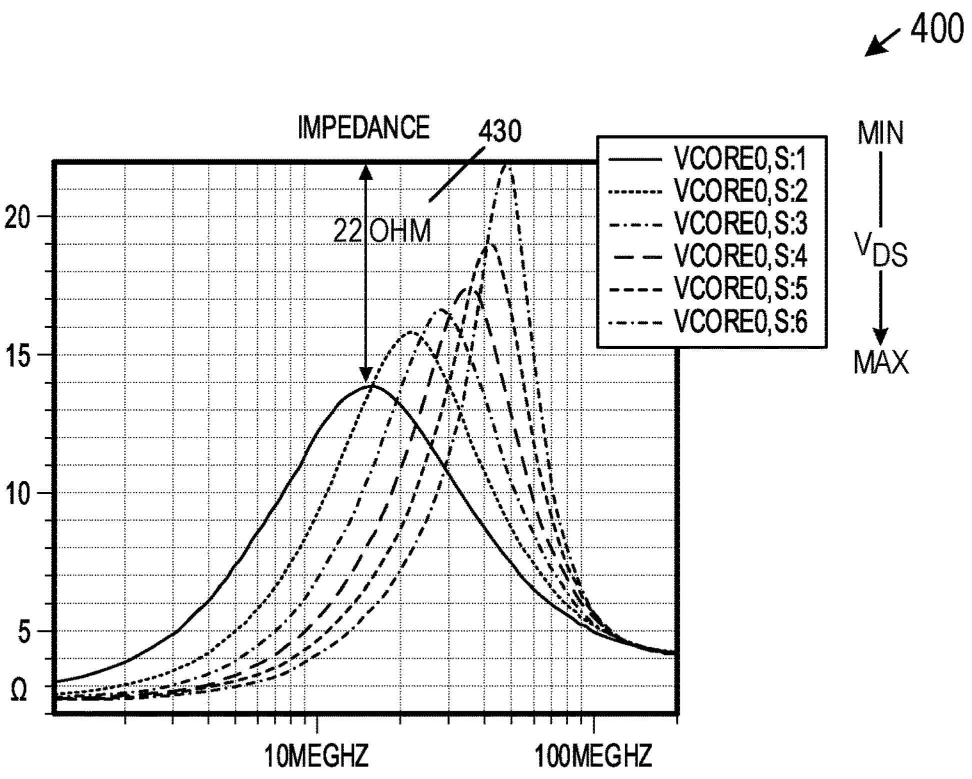
Figure 4D:
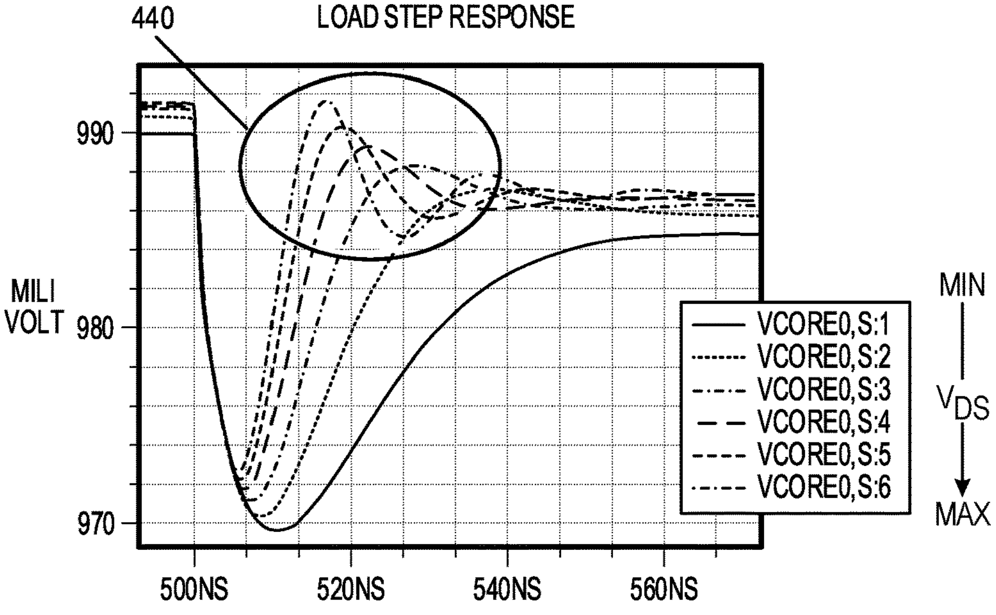

FIG. 4A shows gain and phase margin Body plots of the gain as a function of frequency, and shows a 20 dB increase 410 in the open loop gain between the minimum and maximum $V_{DS}$. FIG. 4B shows a phase margin Body plot of the phase margin as a function of frequency, and shows a 40-degree drop 420 between the minimum and maximum $V_{DS}$ within a 50 MHz range. FIG. 4C shows an impedance profile with gain adjustment only, which shows the output impedance $Z_{OUT}$ as a function of frequency, and shows a 22 ohm increase 430 between the minimum and maximum $V_{DS}$. FIG. 4D shows a load step response with gain adjustment only, which shows a substantial deterioration in DLVR stability 440 between the minimum and maximum $V_{DS}$.

Figure 4E:
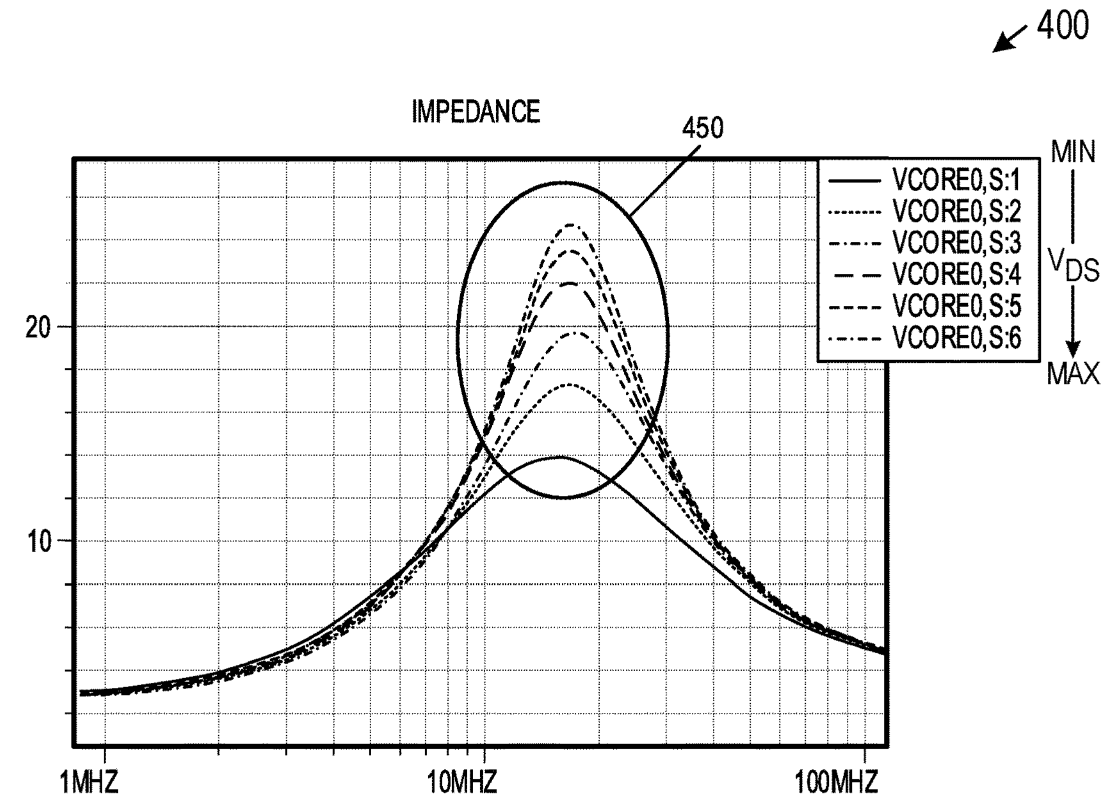
Figure 4F:
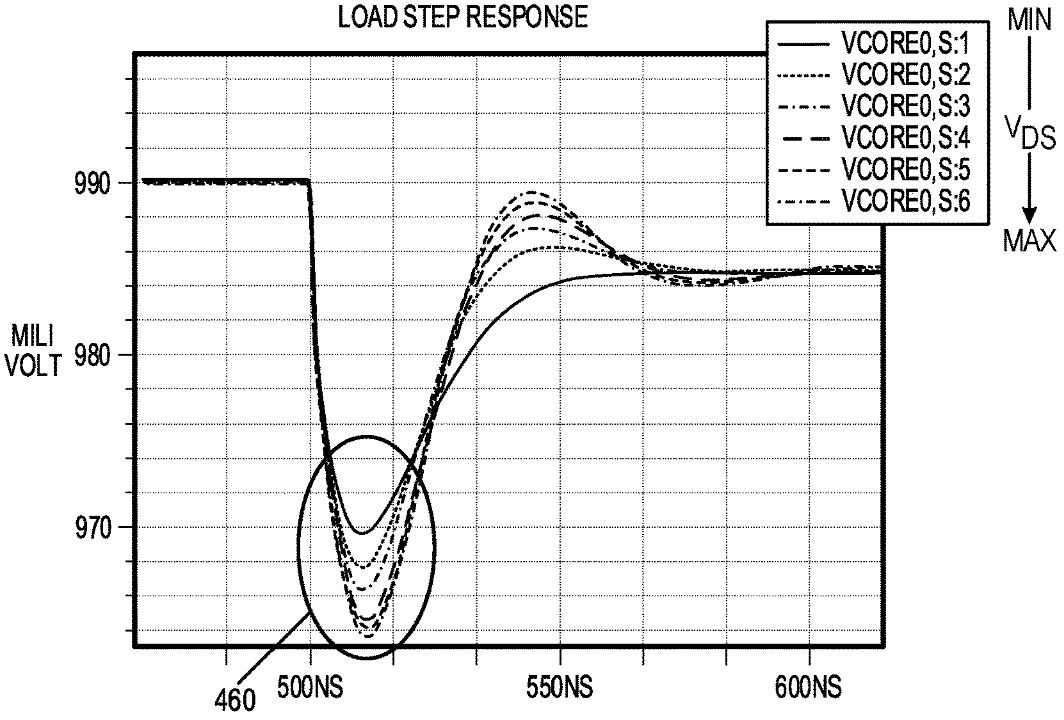

DLVR stability may be improved by reducing the open-loop gain in the case of large dropouts. However, this approach does not address the challenge of the dependency of $V_{MIN}$ on DO. FIG. 4E shows an impedance profile with gain and phase adjustment, which still shows an impedance increase 450 between the minimum and maximum $V_{DS}$. FIG. 4E shows a load step response with gain and phase adjustment, which still shows a deterioration in DLVR stability 460 between the minimum and maximum $V_{DS}$. As is evident from FIGS. 4E and 4F, both $Z_{OUT}$ and transient step response still feature dependency on dropouts. The domain $V_{MIN}$ remains dependent on $V_{IN}$, and the reduced open-loop gain does not fully achieve the goals of power reduction and testing simplification.

Figure 5:
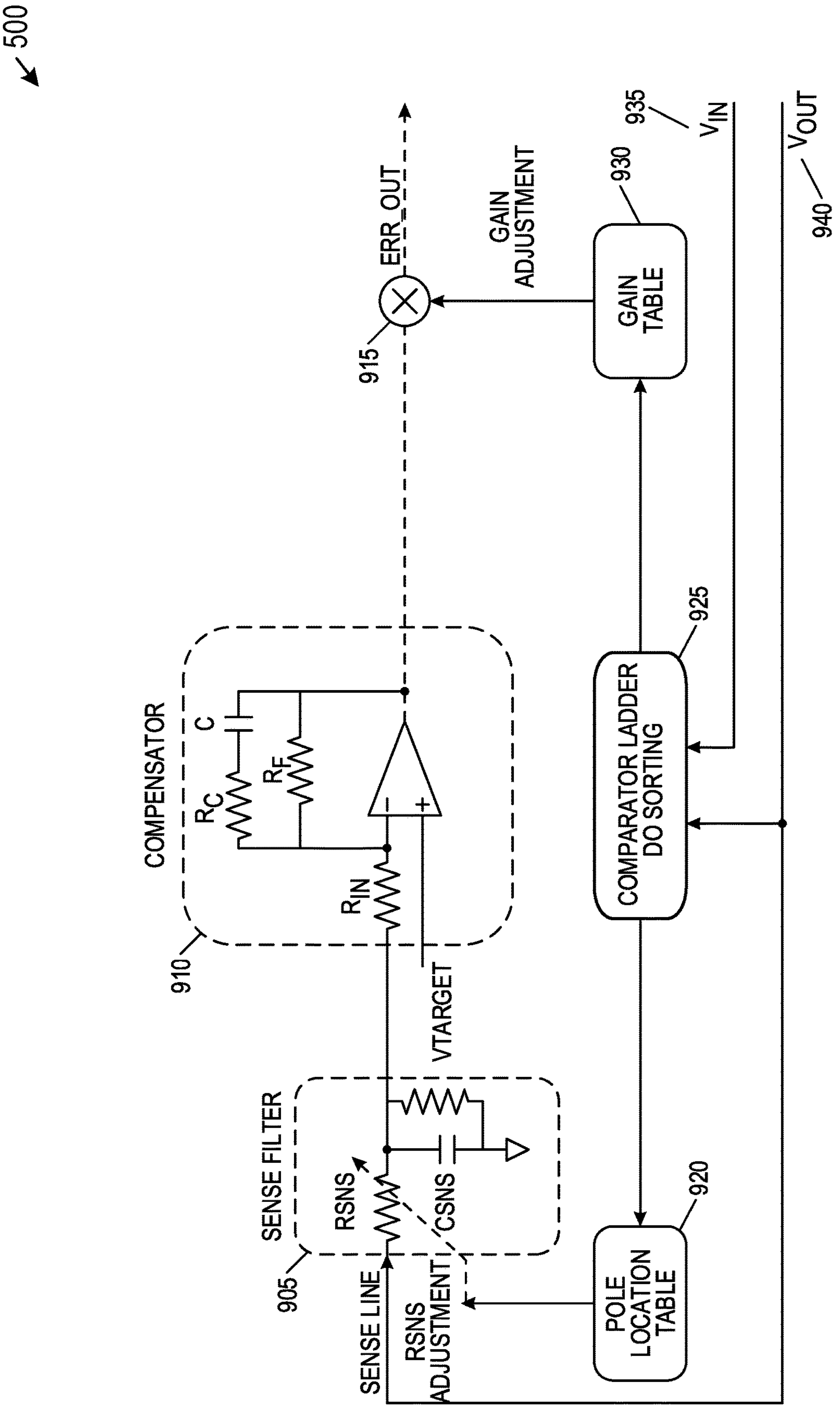
FIG. 5 is a circuit diagram illustrating a DLVR TF circuit, according to an embodiment.

FIG. 5 is a circuit diagram illustrating a DLVR TF circuit 500, according to an embodiment. The DLVR TF circuit 500 may be used to modify (e.g., shape) both gain and phase of a DLVR TF based on the value of DO(t). The modification of phase may include a real-time modulation of the RC constant within the sense filter (SF) 905, which may be used to change the poles location of the SF 905. The DLVR transient response strongly depends on loop delay, where an increase in loop delay results in a deeper transient droop and a worse $V_{MIN}$. The compensator (CPS) 910 may contribute significantly to the total loop delay, and may be designed to reduce or minimize the total loop delay. The shaping of the gain and phase may be implemented so as not to increase the total loop delay caused by the CPS 910.

Prior to implementation of the DLVR TF circuit 500 (e.g., during the pre-Si phase), the DO range may be divided into n sub-ranges (e.g., n buckets). For each bucket, parameters for corresponding modification of the open loop gain and RC constant of the sense filter 905 are pre-calculated and stored in tables. These bucket thresholds and TF adjustment coefficients may also be fully tunable following circuit implementation (e.g., post-Si). During the post-Si phase, bucket thresholds and TF adjustment coefficients may be improved or optimized through lab validation, such as using voltage and current step response validation or similar methodology.

In operation, the DLVR output voltage $V_{OUT}(t)$ 940 is sensed and compared to a target value. A CPS computation outcome is then calculated with respect to a predetermined reference DO value. In parallel, a comparator ladder 925 monitors DO(t) based on $V_{IN}(t)$ 935 and $V_{OUT}(t)$ 940. The comparator ladder 925 then maps DO(t) to one of the predetermined buckets, and the TF adjustment coefficients for each reference bucket are then chosen using the pole location table 920 and the gain table 930. This use of location table 920 and gain table 930 enables the TF adjustment coefficients to be provided not later than the results of the basic CPS computation so as not to increase the total loop delay caused by the CPS 910. The output of the CPS 910 then is multiplied in a gain multiplier 915 by gain adjustment coefficients provided by the gain table 930 and delivered to the power stage. Similarly, the poles of the sense filter 905 are modified in parallel, and they may be used to modify a variable resistor to modify the RC constant of the sense filter 905 for the next $V_{OUT}$ sampling event. By modifying the RC constant of the sense filter 905 and modifying the gain used in the gain multiplier 915, DLVR TF circuit 500 provides the ability to modify the TF to become almost non-dependent on DO without affecting the compensator 910, such as shown in FIGS. 6A-6B.

Figure 6A:
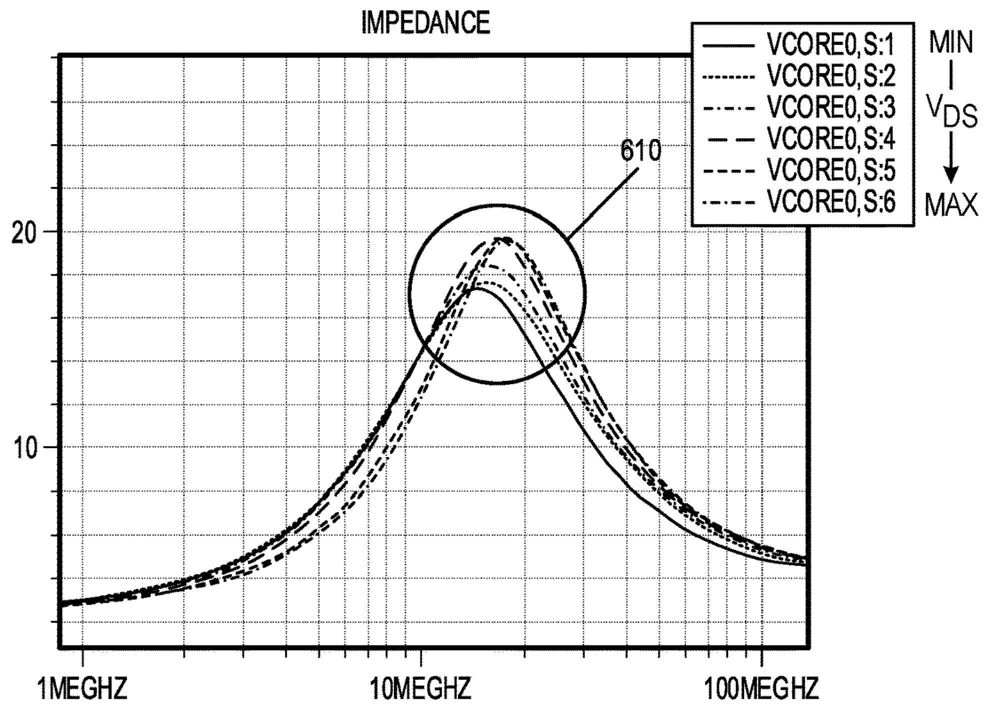
FIGS. 6A-6B are graphs showing shaped gain and phase DLVR characteristics, according to an embodiment.
Figure 6B:
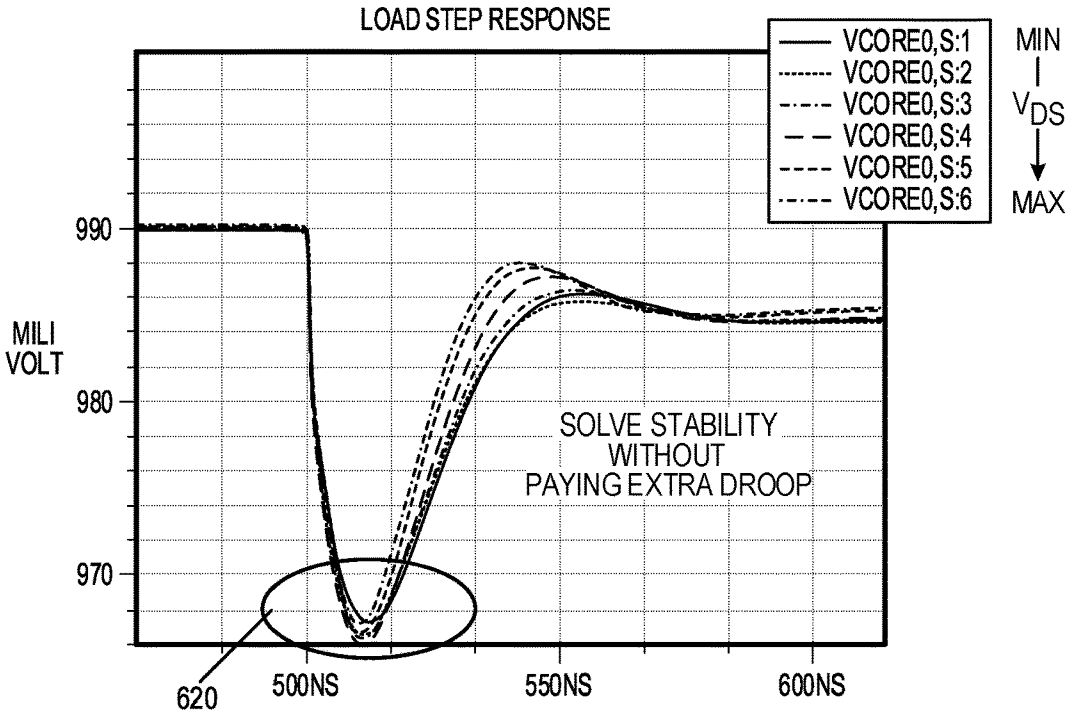

FIGS. 6A-6B are graphs showing shaped gain and phase DLVR characteristics 600, according to an embodiment. The DLVR characteristics 600 shown in FIGS. 6A-6B are based on the gain and phase shaping provided by DLVR TF circuit 500 shown in FIG. 5. FIG. 6A shows the output impedance $Z_{OUT}$ as a function of frequency, and shows a reduced impedance range 610 between the minimum and maximum $V_{DS}$. FIG. 6B shows a load step response as a function of time, and shows a reduced deterioration in DLVR stability 620 between the minimum and maximum $V_{DS}$. As shown in FIGS. 6A-6B, the gain and phase shaping provided by DLVR TF circuit 500 significantly reduce the DO dependency of $Z_{OUT}$ and the load step response.

Figure 7:
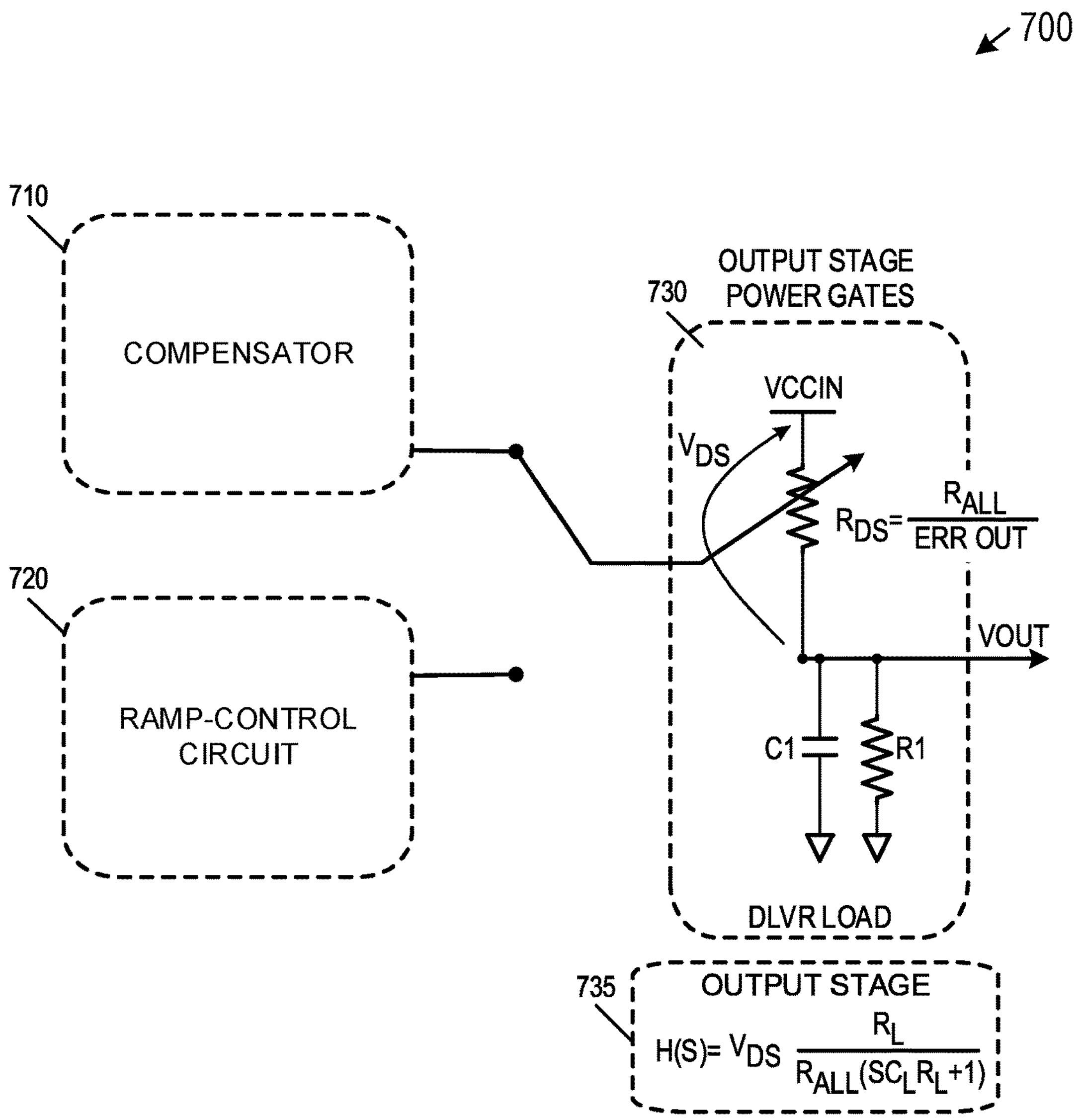
FIG. 7 is a circuit diagram illustrating a bypass circuit, according to an embodiment.

FIG. 7 is a circuit diagram illustrating a bypass circuit 700, according to an embodiment. When reaching or falling below a first minimal threshold DO value, the DLVR may transition from a regulated (REG) mode to a bypass (e.g., power gate (PG)) mode. To transition from regulated to bypass mode, the output stage power gates 730 may be disconnected from a compensator 710 and connected to a ramp-control circuit 720. The ramp-control circuit 720 may be configured to cause the power gates 730 to become conductive gradually in predetermined steps. Conversely, when the dropout becomes larger than a second pre-defined threshold, the DLVR may transition from the bypass mode to the regulated mode. To transition from bypass to regulated mode, reset the compensator 710 by flushing the compensator pipe while all power gates 730 are conducting, reconnect the compensator 710 and the power gates 730 control feedback loop, and gradually change the DLVR voltage target to its final required level.

To initiate a transition between modes (e.g., bypass to regulated, regulated to bypass), a difference between the input voltage and the target voltages may be compared continuously to pre-defined threshold values. Upon meeting or crossing a threshold, a respective transition is initiated. Because the transitions between bypass mode and regulated mode are dynamic and tunable, the thresholds to initiate each transition may be determined empirically to improve or optimize the transition and DLVR performance. These thresholds may be different from each other, and may each be temperature or voltage dependent.

This transition between regulated and bypass modes may be used to reduce or minimize a DLVR performance deterioration under low DO conditions and consequent degradation (e.g., increase) of $V_{MIN}$. As described above, a low DO may cause a deeper and wider $V_{OUT}$ power plain transient response to a load step, and may reduce accuracy of DLVR DC positioning. These effects on transient response and DC positioning may lead to an increase in the minimal voltage $V_{MIN}$ at which a full test suite of a given domain may pass. In contrast, when the DLVR in PG mode provides improved transient response and the $V_{OUT}$ level is slightly higher than the required (e.g., target) level, and consequently $V_{MIN\_PGmode} \leq V_{MIN\_REGmode}$.

Figure 8:
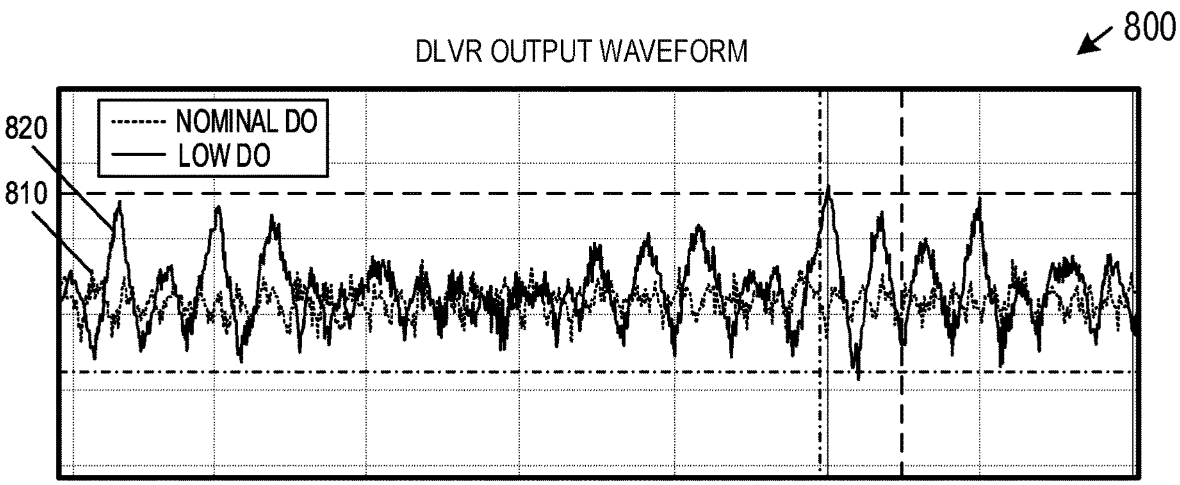
FIG. 8 is a graph showing gain reduction DLVR behavior, according to an embodiment.

FIG. 8 is a graph showing gain reduction DLVR behavior 800, according to an embodiment. The effects of gain reduction on DLVR output can be seen in FIG. 8, which compares DLVR output under a nominal DO condition 810 against a DLVR output under a low DO condition 820. Although the difference between the transient droops of the two waveforms may be relatively small (e.g., ≤10 mV), these droops result in a substantial $V_{MIN}$ elevation (e.g., 10 mV). While DLVR gain is proportional to the difference $V_{IN}(t)-V_{OUT}(t)$ and not proportional to the DO difference of $V_{IN}(t)-V_{WP}$, the use of DO in initiating each mode transition may be used to filter out undesired mode transitions that originate from very fast $V_{OUT}(t)$ transient features, and may be used to simplify the control scheme.

Figure 9:
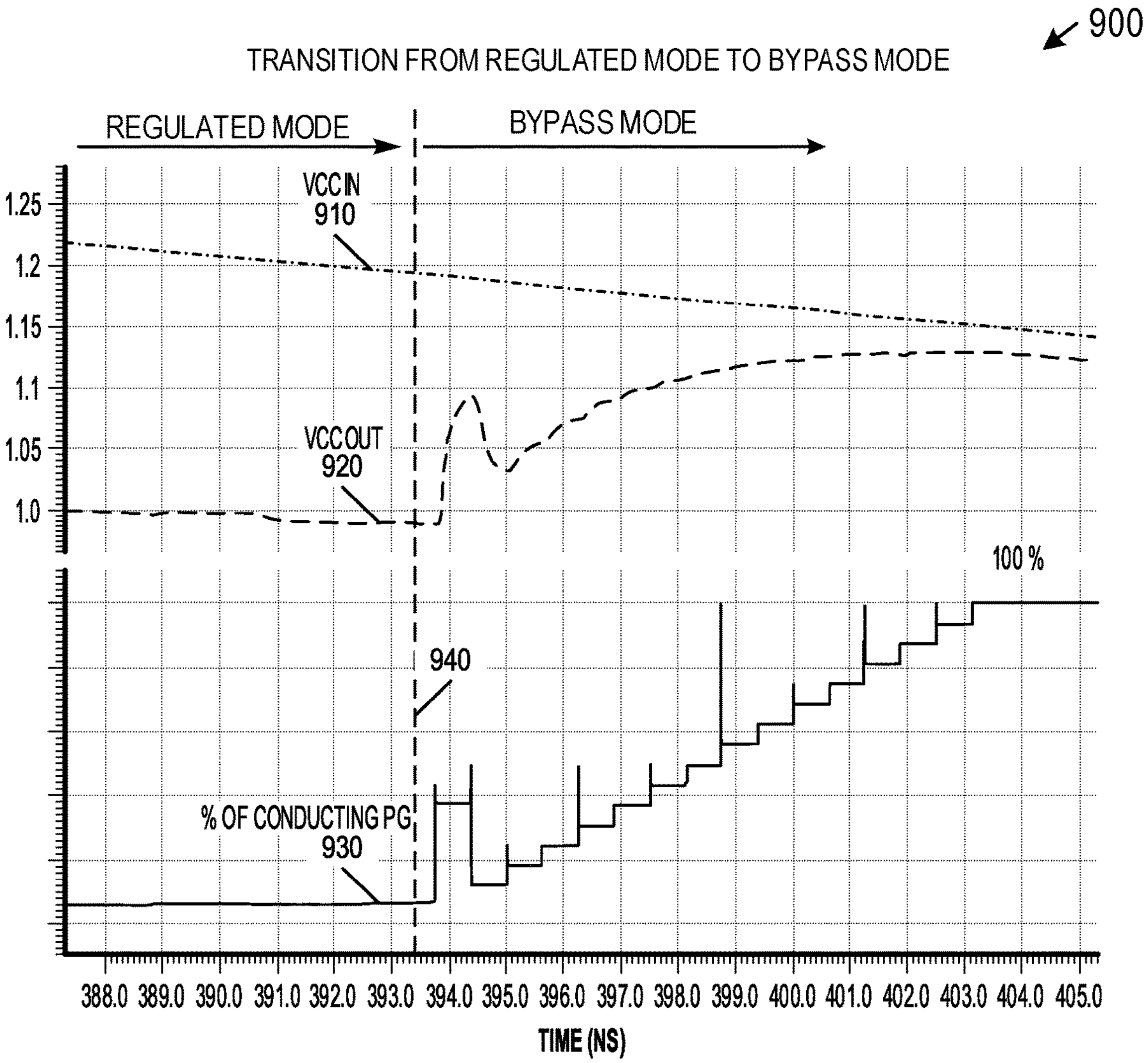
FIG. 9 is a graph showing the regulated to bypass transition, according to an embodiment.

FIG. 9 is a graph showing the regulated to bypass transition 900, according to an embodiment. Regulated to bypass transition 900 shows input $V_{CC}$ 910, output $V_{CC}$ 910, and the percent of conducting power gates 930 as a function of time. At transition point 940, the power gates are disconnected from the compensator and connected to the ramp-control circuit, and the ramp-control circuit increases the percent of conducting power gates 930 in a predetermined and stepwise fashion. The ramp-control circuit enables careful control of the pace of opening the power gates to avoid possible droop at the DLVR $V_{IN}$ rail, which may negatively affect other circuits connected to this rail.

Figure 10:
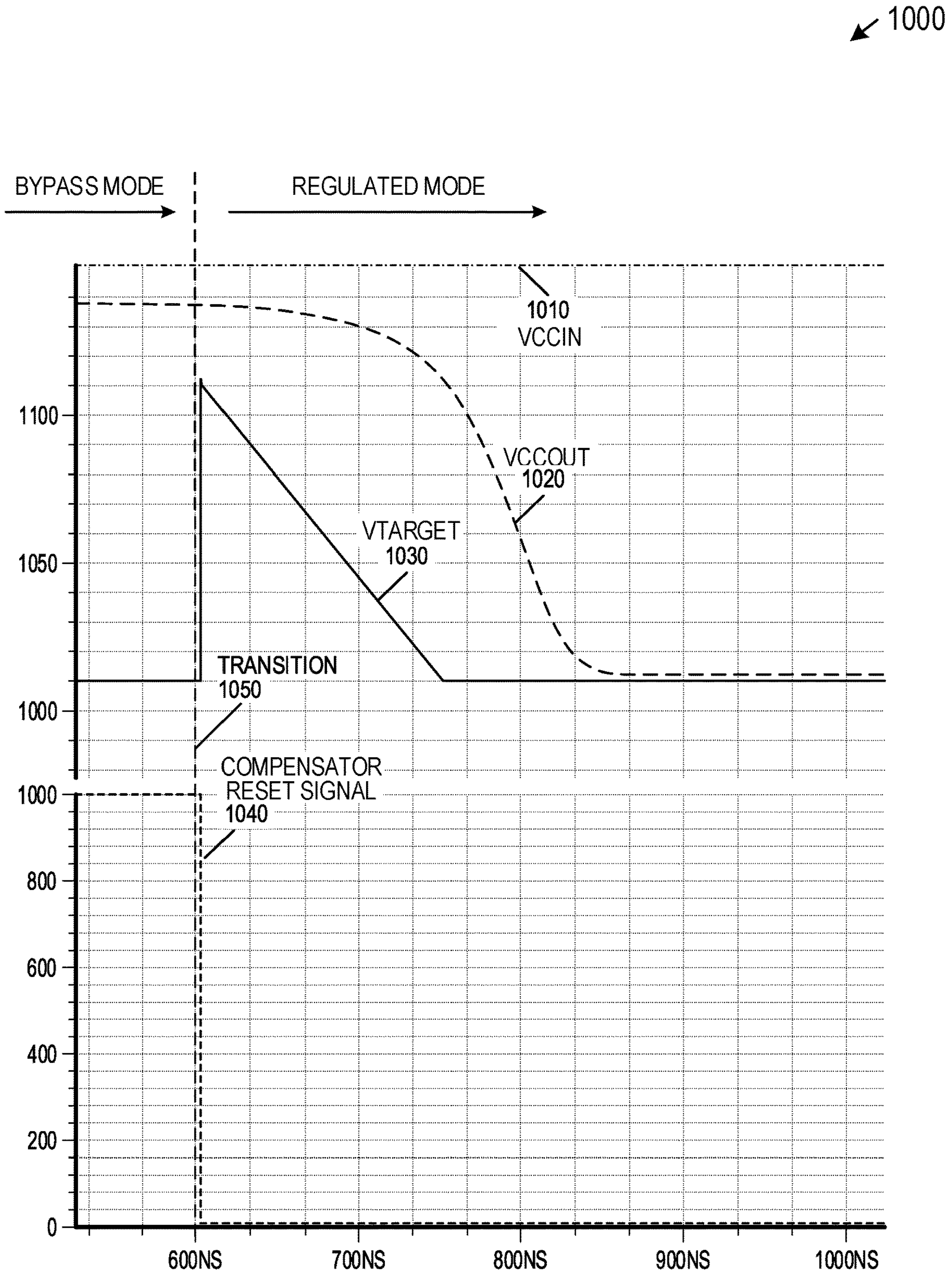
FIG. 10 is a graph showing the bypass to regulated transition, according to an embodiment.

FIG. 10 is a graph showing the bypass to regulated transition 1000, according to an embodiment. Bypass to regulated transition 1000 shows input $V_{CC}$ 1010, output $V_{CC}$ 1010, $V_{target}$ 1030, and the compensator reset signal 1040. Initially all (e.g., 100% of) power stage segments are conducting until transition point 1050, at which the compensator reset signal 1040 is triggered and $V_{target}$ 1030 is raised temporality toward input $V_{CC}$ 1010. The compensator and power stage control feedback loop are then reconnected, and the DLVR voltage target is gradually changed to its final required level. The steps within the bypass to regulated transition 1000 should be carefully controlled, as failing to control the steps may result in unwanted droop and continuous chattering due to the reaction of the DLVR control loop.

Figure 11:
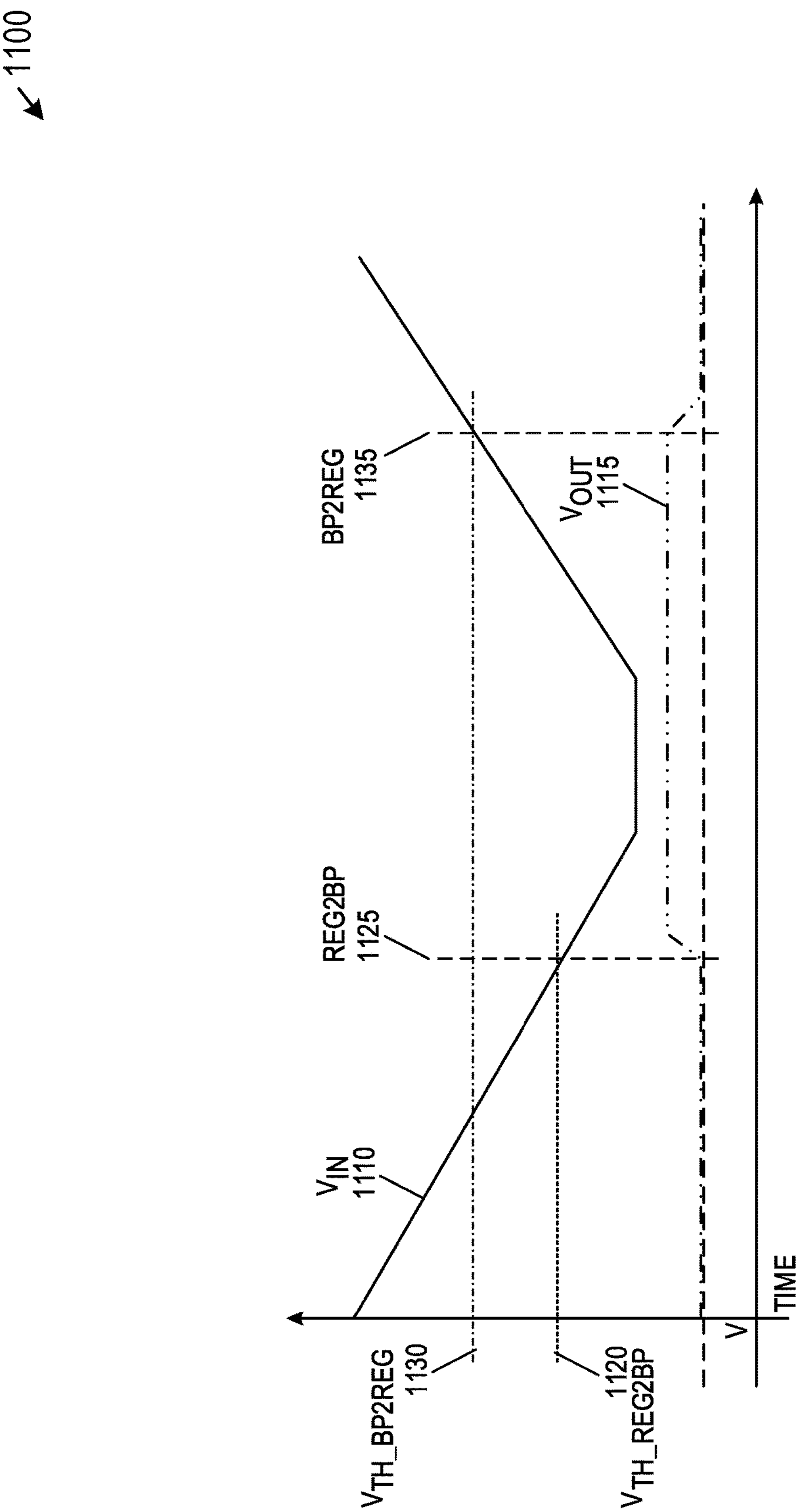
FIG. 11 is a graph showing the transition voltages, according to an embodiment.

FIG. 11 is a graph showing the transition voltages 1100, according to an embodiment. Transitions 1100 show $V_{in}$ 1110 and $V_{out}$ 1115 as a function of time. $V_{in}$ 1110 may be set high initially and reduced while maintaining a target $V_{out}$ and monitoring $V_{out}$ 1115. When $V_{in}$ 1110 crosses the voltage threshold for transitioning from regulated to bypass 1120 the transition from regulated to bypass 1125 occurs, which results in a slight increase in $V_{out}$ 1115. To transition from bypass to regulated mode, $V_{in}$ 1110 may be increased steadily. When $V_{in}$ 1110 crosses the voltage threshold for transitioning from bypass to regulated 1130 the transition from bypass to regulated 1135 occurs, which results in a slight decrease in $V_{out}$ 1115.

Figure 12:
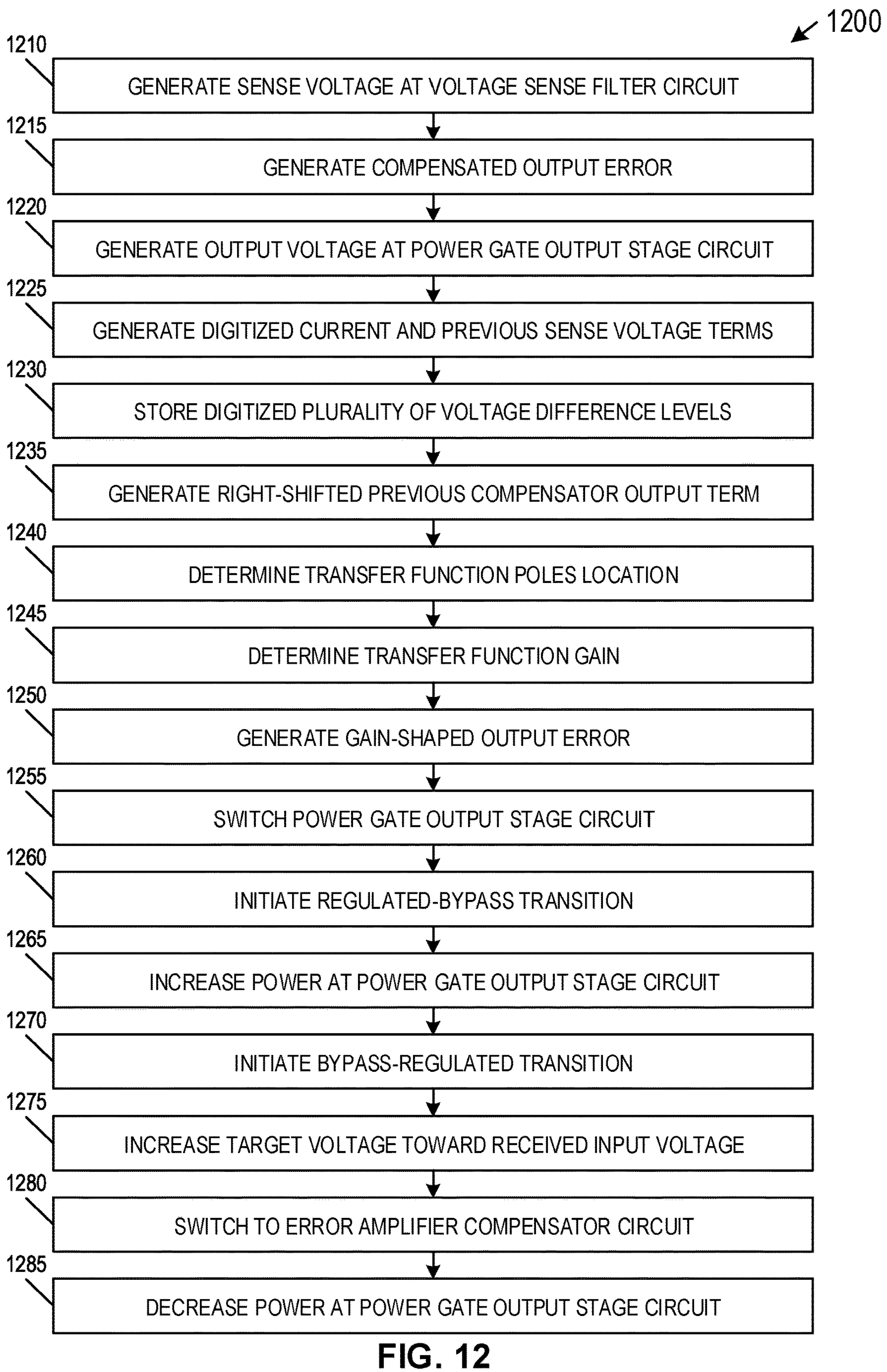
FIG. 12 is a flowchart illustrating a method, according to an embodiment.

FIG. 12 is a flowchart illustrating a method 1200, according to an embodiment. Method 1200 includes generating 1210 a sense voltage at a voltage sense filter circuit based on a received input voltage. Method 1200 further includes generating 1215 a compensated output error at an error amplifier compensator circuit based on a digitized current sense voltage term, a digitized previous sense voltage term, and a right-shifted previous compensator output term. Method 1200 further includes generating 1220 an output voltage at a power gate output stage circuit based on the compensated output error.

Method 1200 may further include generating 1225 the digitized current sense voltage term and the digitized previous sense voltage term based on a digitization of a difference between a target voltage and the sense voltage. The digitization of the difference between a target voltage and the sense voltage includes a logarithmic flash windowing analog-to-digital converter generating a digitized plurality of voltage difference levels. Method 1200 may further include storing 1230 the digitized plurality of voltage difference levels at a sense voltage term memory circuit.

Method 1200 may further include generating 1235 the right-shifted previous compensator output term based on a previous compensator output term. Method 1200 may further include determining 1240 a transfer function poles location at a dropout comparator based on a comparison between the input voltage and the output voltage. The voltage sense filter circuit may modify a resistance of a variable sense resistor based on the transfer function poles location, the variable sense resistor to modulate a time constant associated with the voltage sense filter. Method 1200 may further include determining 1245 a transfer function gain at the dropout comparator based on the comparison between the input voltage and the output voltage. Method 1200 may further include generating 1250 a gain-shaped output error at a gain multiplier based on the transfer function gain and the compensated output error. Method 1200 may further include switching 1255 the power gate output stage circuit at a mode switch between the error amplifier compensator circuit and a ramp control circuit.

Method 1200 may further include initiating 1260 a regulated-bypass transition from a regulated mode to a bypass mode at the mode switch by switching from the error amplifier compensator circuit to the ramp control circuit and increasing 1265 power at the power gate output stage circuit in a gradual and stepwise function subsequent to the mode switch initiating the regulated-bypass transition. Method 1200 may further include initiating 1270 a bypass-regulated transition from the bypass mode to the regulated mode at the error amplifier compensator circuit by flushing a plurality of compensator values, increasing 1275 the target voltage toward the received input voltage, switching 1280 from the ramp control circuit to the error amplifier compensator circuit at the mode switch, and decreasing 1285 power at the power gate output stage circuit in the gradual and stepwise function.

Figure 13:
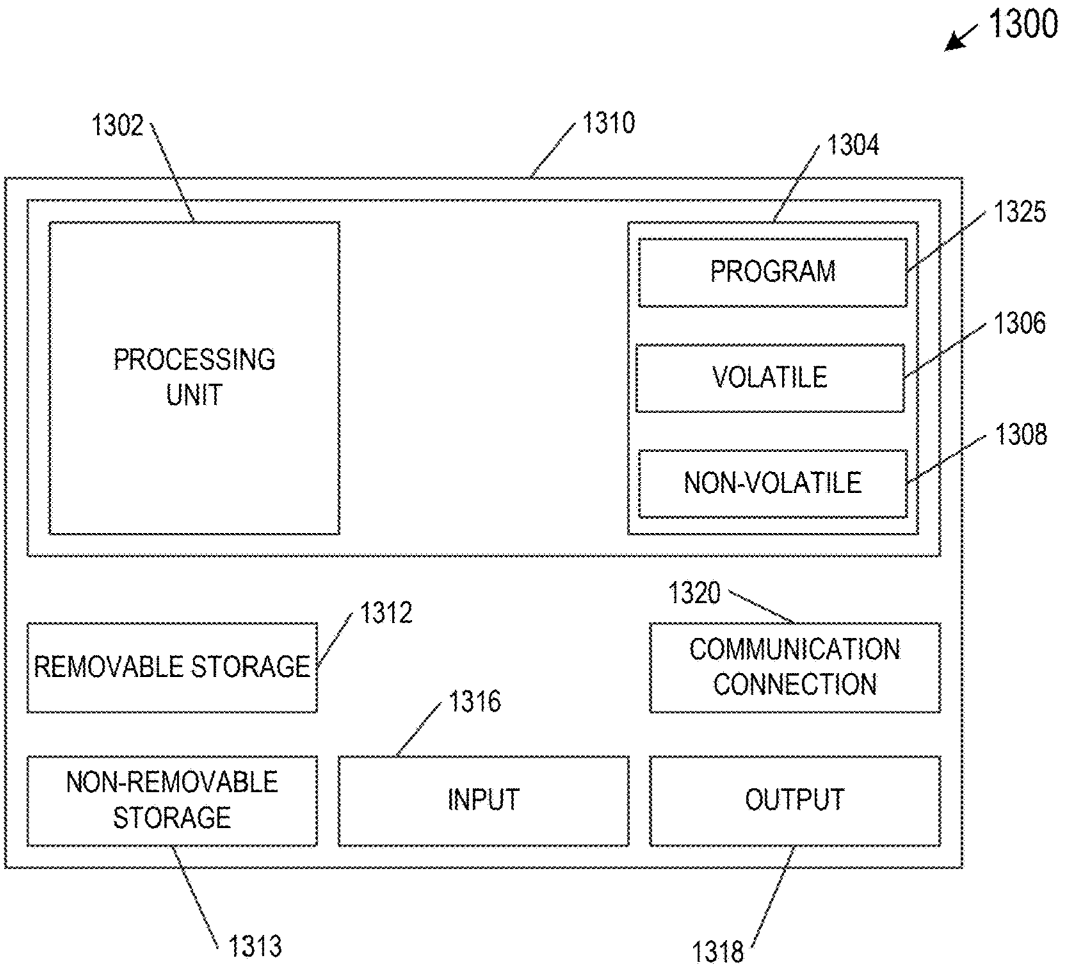
FIG. 13 is a block diagram of a computing device, according to an embodiment.

FIG. 13 is a block diagram of a computing device 1300, according to an embodiment. The performance of one or more components within computing device 1300 may be improved by including one or more of the circuits or circuitry methods described herein. In one embodiment, multiple such computer systems are used in a distributed network to implement multiple components in a transaction-based environment. An object-oriented, service-oriented, or other architecture may be used to implement such functions and communicate between the multiple systems and components. In some embodiments, the computing device of FIG. 13 is an example of a client device that may invoke methods described herein over a network. In other embodiments, the computing device is an example of a computing device that may be included in or connected to a motion interactive video projection system, as described elsewhere herein. In some embodiments, the computing device of FIG. 13 is an example of one or more of the personal computer, smartphone, tablet, or various servers.

One example computing device in the form of a computer 1310, may include a processing unit 1302, memory 1304, removable storage 1312, and non-removable storage 1314. Although the example computing device is illustrated and described as computer 1310, the computing device may be in different forms in different embodiments. For example, the computing device may instead be a smartphone, a tablet, or other computing device including the same or similar elements as illustrated and described with regard to FIG. 13. Further, although the various data storage elements are illustrated as part of the computer 1310, the storage may include cloud-based storage accessible via a network, such as the Internet.

Returning to the computer 1310, memory 1304 may include volatile memory 1306 and non-volatile memory 1308. Computer 1310 may include or have access to a computing environment that includes a variety of computer-readable media, such as volatile memory 1306 and non-volatile memory 1308, removable storage 1312 and non-removable storage 1314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1310 may include or have access to a computing environment that includes input 1316, output 1318, and a communication connection 1320. The input 1316 may include one or more of a touchscreen, touchpad, mouse, keyboard, camera, and other input devices. The input 1316 may include a navigation sensor input, such as a GNSS receiver, a SOP receiver, an inertial sensor (e.g., accelerometers, gyroscopes), a local ranging sensor (e.g., LIDAR), an optical sensor (e.g., cameras), or other sensors. The computer may operate in a networked environment using a communication connection 1320 to connect to one or more remote computers, such as database servers, web servers, and another computing device. An example remote computer may include a personal computer (PC), server, router, network PC, a peer device or other common network node, or the like. The communication connection 1320 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 1302 of the computer 1310. A hard drive (magnetic disk or solid state), CD-ROM, and RAM are some examples of articles including a non-transitory computer-readable medium. For example, various computer programs 1325 or apps, such as one or more applications and modules implementing one or more of the methods illustrated and described herein or an app or application that executes on a mobile device or is accessible via a web browser, may be stored on a non-transitory computer-readable medium.

The apparatuses and methods described above may include or be included in high-speed computers, communication and signal processing circuitry, single-processor module or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

In the detailed description and the claims, the term "on" used with respect to two or more elements (e.g., materials), one "on" the other, means at least some contact between the elements (e.g., between the materials). The term "over" means the elements (e.g., materials) are in close proximity, but possibly with one or more additional intervening elements (e.g., materials) such that contact is possible but not required. Neither "on" nor "over" implies any directionality as used herein unless stated as such.

In the detailed description and the claims, a list of items joined by the term "at least one of" may mean any combination of the listed items. For example, if items A and B are listed, then the phrase "at least one of A and B" means A only; B only; or A and B. In another example, if items A, B, and C are listed, then the phrase "at least one of A, B and C" means A only; B only; C only; A and B (excluding C); A and C (excluding B); B and C (excluding A); or all of A, B, and C. Item A may include a single element or multiple elements. Item B may include a single element or multiple elements. Item C may include a single element or multiple elements.

In the detailed description and the claims, a list of items joined by the term "one of" may mean only one of the list items. For example, if items A and B are listed, then the phrase "one of A and B" means A only (excluding B), or B only (excluding A). In another example, if items A, B, and C are listed, then the phrase "one of A, B and C" means A only; B only; or C only. Item A may include a single element or multiple elements. Item B may include a single element or multiple elements. Item C may include a single element or multiple elements.

Additional Notes and Examples

Example 1 is a digital linear voltage regulator apparatus comprising: a voltage sense filter circuit to generate a sense voltage based on a received input voltage; an error amplifier compensator circuit to generate a compensated output error based on the sense voltage; and a power gate output stage circuit to generate an output voltage based on the compensated output error.

In Example 2, the subject matter of Example 1 includes, wherein the error amplifier compensator circuit generates the compensated output error further based on a digitized current sense voltage term, a digitized previous sense voltage term, and a right-shifted previous compensator output term.

In Example 3, the subject matter of Example 2 includes, the error amplifier compensator circuit further to generate the digitized current sense voltage term and the digitized previous sense voltage term based on a digitization of a difference between a target voltage and the sense voltage.

In Example 4, the subject matter of Example 3 includes, wherein the digitization of the difference between a target voltage and the sense voltage includes a logarithmic flash windowing analog-to-digital converter generating a digitized plurality of voltage difference levels.

In Example 5, the subject matter of Example 4 includes, a sense voltage term memory circuit to store the digitized plurality of voltage difference levels.

In Example 6, the subject matter of Examples 3-5 includes, the error amplifier compensator circuit further to generate the right-shifted previous compensator output term based on a previous compensator output term.

In Example 7, the subject matter of Examples 2-6 includes, a dropout comparator to determine a transfer function poles location based on a comparison between the input voltage and the output voltage.

In Example 8, the subject matter of Example 7 includes, wherein the voltage sense filter circuit modifies a resistance of a variable sense resistor based on the transfer function poles location, the variable sense resistor to modulate a time constant associated with the voltage sense filter.

In Example 9, the subject matter of Examples 2-8 includes, the dropout comparator further to determine a transfer function gain based on the comparison between the input voltage and the output voltage.

In Example 10, the subject matter of Examples 7-9 includes, a gain multiplier to generate a gain-shaped output error based on the transfer function gain and the compensated output error.

In Example 11, the subject matter of Examples 2-10 includes, a ramp control circuit; and a mode switch to switch the power gate output stage circuit between the error amplifier compensator circuit and the ramp control circuit.

In Example 12, the subject matter of Example 11 includes, wherein: the mode switch initiates a regulated-bypass transition from a regulated mode to a bypass mode by switching from the error amplifier compensator circuit to the ramp control circuit; and the ramp control circuit causes the power gate output stage circuit to increase power in a gradual and stepwise function subsequent to the mode switch initiating the regulated-bypass transition.

In Example 13, the subject matter of Examples 11-12 includes, wherein: the error amplifier compensator circuit initiates a bypass-regulated transition from the bypass mode to the regulated mode by flushing a plurality of compensator values; the target voltage is increased toward the received input voltage; the mode switch switches from the ramp control circuit to the error amplifier compensator circuit; and the ramp control circuit causes the power gate output stage circuit to decrease power in the gradual and stepwise function.

Example 14 is a method for digital linear voltage regulation, the method comprising: generating a sense voltage at a voltage sense filter circuit based on a received input voltage; receiving the sense voltage at an error amplifier compensator circuit; generating a compensated output error at the error amplifier compensator circuit based on the sense voltage; and generating an output voltage at a power gate output stage circuit based on the compensated output error.

In Example 15, the subject matter of Example 14 includes, wherein the generation of the compensated output error is further based on a digitized current sense voltage term, a digitized previous sense voltage term, and a right-shifted previous compensator output term.

In Example 16, the subject matter of Example 15 includes, generating the digitized current sense voltage term and the digitized previous sense voltage term based on a digitization of a difference between a target voltage and the sense voltage.

In Example 17, the subject matter of Example 16 includes, wherein the digitization of the difference between a target voltage and the sense voltage includes a logarithmic flash windowing analog-to-digital converter generating a digitized plurality of voltage difference levels.

In Example 18, the subject matter of Example 17 includes, storing the digitized plurality of voltage difference levels at a sense voltage term memory circuit.

In Example 19, the subject matter of Examples 16-18 includes, generating the right-shifted previous compensator output term based on a previous compensator output term.

In Example 20, the subject matter of Examples 15-19 includes, determining a transfer function poles location at a dropout comparator based on a comparison between the input voltage and the output voltage.

In Example 21, the subject matter of Example 20 includes, wherein the voltage sense filter circuit modifies a resistance of a variable sense resistor based on the transfer function poles location, the variable sense resistor to modulate a time constant associated with the voltage sense filter.

In Example 22, the subject matter of Examples 15-21 includes, determining a transfer function gain at the dropout comparator based on the comparison between the input voltage and the output voltage.

In Example 23, the subject matter of Examples 20-22 includes, generating a gain-shaped output error at a gain multiplier based on the transfer function gain and the compensated output error.

In Example 24, the subject matter of Examples 14-23 includes, switching the power gate output stage circuit at a mode switch between the error amplifier compensator circuit and a ramp control circuit.

In Example 25, the subject matter of Example 24 includes, initiating a regulated-bypass transition from a regulated mode to a bypass mode at the mode switch by switching from the error amplifier compensator circuit to the ramp control circuit; and causing the power gate output stage circuit to increase power in a gradual and stepwise function subsequent to the mode switch initiating the regulated-bypass transition.

In Example 26, the subject matter of Examples 24-25 includes, initiating a bypass-regulated transition from the bypass mode to the regulated mode at the error amplifier compensator circuit by flushing a plurality of compensator values; increasing the target voltage toward the received input voltage; switching from the ramp control circuit to the error amplifier compensator circuit at the mode switch; and causing the power gate output stage circuit to decrease power in the gradual and stepwise function.

Example 27 is at least one non-transitory machine-readable storage medium, comprising a plurality of instructions that, responsive to being executed with processor circuitry of a computer-controlled device, cause the processing circuitry to: generate a sense voltage at a voltage sense filter circuit based on a received input voltage; receive the sense voltage at an error amplifier compensator circuit; generate a compensated output error at the error amplifier compensator circuit based on a digitized current sense voltage term, a digitized previous sense voltage term, and a right-shifted previous compensator output term; and generate an output voltage at a power gate output stage circuit based on the compensated output error.

In Example 28, the subject matter of Example 27 includes, the instructions further causing the processing circuitry to generate the digitized current sense voltage term and the digitized previous sense voltage term based on a digitization of a difference between a target voltage and the sense voltage.

In Example 29, the subject matter of Example 28 includes, wherein the digitization of the difference between a target voltage and the sense voltage includes a logarithmic flash windowing analog-to-digital converter generating a digitized plurality of voltage difference levels.

In Example 30, the subject matter of Example 29 includes, the instructions further causing the processing circuitry to store the digitized plurality of voltage difference levels at a sense voltage term memory circuit.

In Example 31, the subject matter of Examples 28-30 includes, the instructions further causing the processing circuitry to generate the right-shifted previous compensator output term based on a previous compensator output term.

In Example 32, the subject matter of Examples 27-31 includes, the instructions further causing the processing circuitry to determine a transfer function poles location at a dropout comparator based on a comparison between the input voltage and the output voltage.

In Example 33, the subject matter of Example 32 includes, wherein the voltage sense filter circuit modifies a resistance of a variable sense resistor based on the transfer function poles location, the variable sense resistor to modulate a time constant associated with the voltage sense filter.

In Example 34, the subject matter of Examples 27-33 includes, the instructions further causing the processing circuitry to determine a transfer function gain at the dropout comparator based on the comparison between the input voltage and the output voltage.

In Example 35, the subject matter of Examples 32-34 includes, the instructions further causing the processing circuitry to generate a gain-shaped output error at a gain multiplier based on the transfer function gain and the compensated output error.

In Example 36, the subject matter of Examples 27-35 includes, the instructions further causing the processing circuitry to switch the power gate output stage circuit at a mode switch between the error amplifier compensator circuit and a ramp control circuit.

In Example 37, the subject matter of Example 36 includes, the instructions further causing the processing circuitry to: initiate a regulated-bypass transition from a regulated mode to a bypass mode at the mode switch by switching from the error amplifier compensator circuit to the ramp control circuit; and cause the power gate output stage circuit to increase power in a gradual and stepwise function subsequent to the mode switch initiating the regulated-bypass transition.

In Example 38, the subject matter of Examples 36-37 includes, the instructions further causing the processing circuitry to: initiate a bypass-regulated transition from the bypass mode to the regulated mode at the error amplifier compensator circuit by flushing a plurality of compensator values; increase the target voltage toward the received input voltage; switch from the ramp control circuit to the error amplifier compensator circuit at the mode switch; and cause the power gate output stage circuit to decrease power in the gradual and stepwise function.

Example 39 is an apparatus for digital linear voltage regulation, the apparatus comprising: means for generating a sense voltage at a voltage sense filter circuit based on a received input voltage; means for receiving the sense voltage at an error amplifier compensator circuit; means for generating a compensated output error at the error amplifier compensator circuit based on a digitized current sense voltage term, a digitized previous sense voltage term, and a right-shifted previous compensator output term; and means for generating an output voltage at a power gate output stage circuit based on the compensated output error.

In Example 40, the subject matter of Example 39 includes, means for generating the digitized current sense voltage term and the digitized previous sense voltage term based on a digitization of a difference between a target voltage and the sense voltage.

In Example 41, the subject matter of Example 40 includes, wherein the means for digitization of the difference between a target voltage and the sense voltage includes a logarithmic flash windowing analog-to-digital converter generating a digitized plurality of voltage difference levels.

In Example 42, the subject matter of Example 41 includes, means for storing the digitized plurality of voltage difference levels at a sense voltage term memory circuit.

In Example 43, the subject matter of Examples 40-42 includes, means for generating the right-shifted previous compensator output term based on a previous compensator output term.

In Example 44, the subject matter of Examples 39-43 includes, means for determining a transfer function poles location at a dropout comparator based on a comparison between the input voltage and the output voltage.

In Example 45, the subject matter of Example 44 includes, wherein the voltage sense filter circuit modifies a resistance of a variable sense resistor based on the transfer function poles location, the variable sense resistor to modulate a time constant associated with the voltage sense filter.

In Example 46, the subject matter of Examples 39-45 includes, means for determining a transfer function gain at the dropout comparator based on the comparison between the input voltage and the output voltage.

In Example 47, the subject matter of Examples 44-46 includes, means for generating a gain-shaped output error at a gain multiplier based on the transfer function gain and the compensated output error.

In Example 48, the subject matter of Examples 39-47 includes, means for switching the power gate output stage circuit at a mode switch between the error amplifier compensator circuit and a ramp control circuit.

In Example 49, the subject matter of Example 48 includes, means for initiating a regulated-bypass transition from a regulated mode to a bypass mode at the mode switch by switching from the error amplifier compensator circuit to the ramp control circuit; and means for causing the power gate output stage circuit to increase power in a gradual and stepwise function subsequent to the mode switch initiating the regulated-bypass transition.

In Example 50, the subject matter of Examples 48-49 includes, means for initiating a bypass-regulated transition from the bypass mode to the regulated mode at the error amplifier compensator circuit by flushing a plurality of compensator values; means for increasing the target voltage toward the received input voltage; means for switching from the ramp control circuit to the error amplifier compensator circuit at the mode switch; and means for causing the power gate output stage circuit to decrease power in the gradual and stepwise function.

Example 51 is a digital linear voltage regulator apparatus comprising: a voltage sense filter circuit to generate a sense voltage based on a received input voltage; an error amplifier compensator circuit to receive the sense voltage and generate a compensated output error based on a digitized current sense voltage term, a digitized previous sense voltage term, and a right-shifted previous compensator output term; a power gate output stage circuit to generate an output voltage based on the compensated output error; and a dropout comparator to determine a transfer function poles location based on a comparison between the input voltage and the output voltage.

In Example 52, the subject matter of Example 51 includes, wherein the voltage sense filter circuit modifies a resistance of a variable sense resistor based on the transfer function poles location, the variable sense resistor to modulate a time constant associated with the voltage sense filter.

In Example 53, the subject matter of Examples 51-52 includes, the dropout comparator further to determine a transfer function gain based on the comparison between the input voltage and the output voltage.

In Example 54, the subject matter of Examples 51-53 includes, a gain multiplier to generate a gain-shaped output error based on the transfer function gain and the compensated output error.

In Example 55, the subject matter of Examples 51-54 includes, the error amplifier compensator circuit further to generate the digitized current sense voltage term and the digitized previous sense voltage term based on a digitization of a difference between a target voltage and the sense voltage.

In Example 56, the subject matter of Example 55 includes, wherein the digitization of the difference between a target voltage and the sense voltage includes a logarithmic flash windowing analog-to-digital converter generating a digitized plurality of voltage difference levels.

In Example 57, the subject matter of Example 56 includes, a sense voltage term memory circuit to store the digitized plurality of voltage difference levels.

In Example 58, the subject matter of Examples 55-57 includes, the error amplifier compensator circuit further to generate the right-shifted previous compensator output term based on a previous compensator output term.

In Example 59, the subject matter of Examples 51-58 includes, a ramp control circuit; and a mode switch to switch the power gate output stage circuit between the error amplifier compensator circuit and the ramp control circuit.

In Example 60, the subject matter of Example 59 includes, wherein: the mode switch initiates a regulated-bypass transition from a regulated mode to a bypass mode by switching from the error amplifier compensator circuit to the ramp control circuit; and the ramp control circuit causes the power gate output stage circuit to increase power in a gradual and stepwise function subsequent to the mode switch initiating the regulated-bypass transition.

In Example 61, the subject matter of Examples 59-60 includes, wherein: the error amplifier compensator circuit initiates a bypass-regulated transition from the bypass mode to the regulated mode by flushing a plurality of compensator values; the target voltage is increased toward the received input voltage; the mode switch switches from the ramp control circuit to the error amplifier compensator circuit; and the ramp control circuit causes the power gate output stage circuit to decrease power in the gradual and stepwise function.

Example 62 is at least one machine-readable medium including instructions that, when executed by processing circuitry, cause the processing circuitry to perform operations to implement of any of Examples 1-61.

Example 63 is an apparatus comprising means to implement of any of Examples 1-61.

Example 64 is a system to implement of any of Examples 1-61.

Example 65 is a method to implement of any of Examples 1-61.

The subject matter of any Examples above may be combined in any combination.

The above description and the drawings illustrate some embodiments of the inventive subject matter to enable those skilled in the art to practice the embodiments of the inventive subject matter. Other embodiments may incorporate structural, logical, electrical, process, and other changes. Examples merely typify possible variations. Portions and features of some embodiments may be included in, or substituted for, those of others. Many other embodiments will be apparent to those of skill in the art upon reading and understanding the above description.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The invention claimed is:

1. A digital linear voltage regulator apparatus comprising:

a voltage sense filter circuit to generate a filtered sense voltage based on a received sense voltage;

an error amplifier compensator circuit to generate a compensated output error based on the filtered sense voltage; and a power gate output stage circuit to generate an output voltage based on the compensated output error, wherein the error amplifier compensator circuit generates the compensated output error further based on a digitized current sense voltage term, a digitized previous sense voltage term, and a right-shifted previous compensator output term.

2. The apparatus of claim 1, the error amplifier compensator circuit further to generate the digitized current sense voltage term and the digitized previous sense voltage term based on a digitization of a difference between a target voltage and the sense voltage.

3. The apparatus of claim 2, wherein the digitization of the difference between a target voltage and the sense voltage includes a logarithmic flash windowing analog-to-digital converter generating a digitized plurality of voltage difference levels.

4. The apparatus of claim 2, the error amplifier compensator circuit further to generate the right-shifted previous compensator output term based on a previous compensator output term.

5. The apparatus of claim 1, further including a dropout comparator to determine a transfer function poles location based on a comparison between the input voltage and the output voltage.

6. The apparatus of claim 5, wherein the voltage sense filter circuit modifies a resistance of a variable sense resistor based on the transfer function poles location, the variable sense resistor to modulate a time constant associated with the voltage sense filter.

7. The apparatus of claim 1, further including:

a ramp control circuit; and a mode switch to switch the power gate output stage circuit between the error amplifier compensator circuit and the ramp control circuit.

8. The apparatus of claim 7, wherein:

the mode switch initiates a regulated-bypass transition from a regulated mode to a bypass mode by switching from the error amplifier compensator circuit to the ramp control circuit; and the ramp control circuit causes the power gate output stage circuit to increase power in a gradual and stepwise function subsequent to the mode switch initiating the regulated-bypass transition.

9. The apparatus of claim 7, wherein:

the error amplifier compensator circuit initiates a bypass-regulated transition from the bypass mode to the regulated mode by flushing a plurality of compensator values;

the target voltage is increased toward the received input voltage;

the mode switch switches from the ramp control circuit to the error amplifier compensator circuit; and the ramp control circuit causes the power gate output stage circuit to decrease power in the gradual and stepwise function.

10. A method for digital linear voltage regulation, the method comprising:

generating a sense voltage at a voltage sense filter circuit based on a received input voltage;

receiving the sense voltage at an error amplifier compensator circuit;

generating a compensated output error at the error amplifier compensator circuit based on the sense voltage;

generating an output voltage at a power gate output stage circuit based on the compensated output error;

switching the power gate output stage circuit at a mode switch between the error amplifier compensator circuit and a ramp control circuit;

initiating a regulated-bypass transition from a regulated mode to a bypass mode at the mode switch by switching from the error amplifier compensator circuit to the ramp control circuit; and causing the power gate output stage circuit to increase power in a gradual and stepwise function subsequent to the mode switch initiating the regulated-bypass transition.

11. The method of claim 10, further including:

initiating a bypass-regulated transition from the bypass mode to the regulated mode at the error amplifier compensator circuit by flushing a plurality of compensator values;

increasing the target voltage toward the received input voltage;

switching from the ramp control circuit to the error amplifier compensator circuit at the mode switch; and causing the power gate output stage circuit to decrease power in the gradual and stepwise function.

12. A digital linear voltage regulator apparatus comprising:

a voltage sense filter circuit to generate a sense voltage based on a received input voltage;

an error amplifier compensator circuit to receive the sense voltage and generate a compensated output error based on a digitized current sense voltage term, a digitized previous sense voltage term, and a right-shifted previous compensator output term;

a power gate output stage circuit to generate an output voltage based on the compensated output error; and a dropout comparator to determine a transfer function poles location based on a comparison between the input voltage and the output voltage.

13. The apparatus of claim 12, wherein the voltage sense filter circuit modifies a resistance of a variable sense resistor based on the transfer function poles location, the variable sense resistor to modulate a time constant associated with the voltage sense filter.

14. The apparatus of claim 12, the dropout comparator further to determine a transfer function gain based on the comparison between the input voltage and the output voltage.

15. The apparatus of claim 12, the error amplifier compensator circuit further to generate the digitized current sense voltage term and the digitized previous sense voltage term based on a digitization of a difference between a target voltage and the sense voltage.

16. The apparatus of claim 12, further including:

a ramp control circuit; and a mode switch to switch the power gate output stage circuit between the error amplifier compensator circuit and the ramp control circuit.

* * * * *